United States Patent
Jiang et al.

(10) Patent No.: US 9,672,841 B2
(45) Date of Patent: Jun. 6, 2017

(54) VOICE ACTIVITY DETECTION METHOD AND METHOD USED FOR VOICE ACTIVITY DETECTION AND APPARATUS THEREOF

(71) Applicant: ZTE Corporation, Shenzhen, Guangdong Province (CN)

(72) Inventors: Dongping Jiang, Shenzhen (CN); Hao Yuan, Shenzhen (CN); Changbao Zhu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 36 days.

(21) Appl. No.: 14/754,714

(22) Filed: Jun. 30, 2015

(65) Prior Publication Data

US 2017/0004840 A1   Jan. 5, 2017

(51) Int. Cl.
| | |
|---|---|
| G10L 15/00 | (2013.01) |
| G10L 21/00 | (2013.01) |
| G10L 21/02 | (2013.01) |
| G10L 25/84 | (2013.01) |
| G10L 25/81 | (2013.01) |
| G10L 25/18 | (2013.01) |
| G10L 15/02 | (2006.01) |
| G10L 25/21 | (2013.01) |
| G10L 25/48 | (2013.01) |
| G10L 21/0224 | (2013.01) |
| G10L 21/0232 | (2013.01) |

(52) U.S. Cl.
CPC .......... G10L 21/0205 (2013.01); G10L 15/02 (2013.01); G10L 21/0224 (2013.01); G10L 21/0232 (2013.01); G10L 25/18 (2013.01); G10L 25/21 (2013.01); G10L 25/48 (2013.01); G10L 25/81 (2013.01); G10L 25/84 (2013.01)

(58) Field of Classification Search
None
See application file for complete search history.

(56) References Cited

U.S. PATENT DOCUMENTS

2003/0004720 A1* 1/2003 Garudadri ............... G10L 15/30
704/247
2008/0300875 A1* 12/2008 Yao ....................... G10L 15/065
704/236
(Continued)

Primary Examiner — Marcus T Riley
(74) Attorney, Agent, or Firm — Ling Wu; Stephen Yang; Ling and Yang Intellectual Property

(57) ABSTRACT

The present document relates to a voice activity detection (VAD) method and methods used for voice activity detection and apparatus thereof, the VAD method includes: obtaining sub-band signals and spectrum amplitudes of a current frame; computing values of a energy feature and a spectral centroid feature of the current frame according to the sub-band signals; computing a signal to noise ratio parameter of the current frame according to a background noise energy estimated from a previous frame, an energy of SNR sub-bands and a energy feature of the current frame; computing a VAD decision result according to a tonality signal flag, a signal to noise ratio parameter, a spectral centroid feature, and a frame energy feature. The methods and apparatus of the present document can improve the accuracy of non-stationary noise (such as office noise) and music detection.

22 Claims, 10 Drawing Sheets

(56) References Cited

U.S. PATENT DOCUMENTS

| 2011/0038489 A1* | 2/2011 | Visser ................... G01S 3/8006 |
| | | 381/92 |
| 2014/0355775 A1* | 12/2014 | Appelbaum ........... H04R 3/002 |
| | | 381/71.1 |
| 2016/0093313 A1* | 3/2016 | Vickers ................... G10L 25/78 |
| | | 704/232 |

* cited by examiner

VOICE ACTIVITY DETECTION METHOD AND METHOD USED FOR VOICE ACTIVITY DETECTION AND APPARATUS THEREOF

TECHNICAL FIELD

The present document relates to a voice activity detection (VAD), a voice activity detection method (including a background noise detection method, a tonality signal detection method, a method for updating the number of active speech hangover frames in a current frame in a VAD decision, and a method for adjusting a signal to noise threshold in a VAD decision) and an apparatus thereof.

BACKGROUND OF THE RELATED ART

In a normal voice call, the user sometimes talks, and sometimes listens, in this case there is inactive speech stage during the call, and under normal circumstances, the whole inactive speech stage of both parties in a call exceeds 50% of the total speech-coding time length of the both parties in the call. In the inactive speech stage, there are only background noises, and usually there is no useful information in the background noises. By this fact, in an audio signal processing process, a voice activity detection (VAD) algorithm is used to detect active speech and inactive speech, and different methods are used for processing. Many modern speech-coding standards such as AMR and AMR-WB support the VAD function. In terms of efficiency, the VAD of these encoders cannot achieve good performance in all of the typical background noises. Especially in the non-stationary noises, the VAD efficiencies of these encoders are relatively low. As for music signals, these VADs sometimes will have wrong detections, resulting in a noticeable decline in the quality of the corresponding processing algorithm.

SUMMARY

To solve the technical problem, the present document provides a voice activity detection (VAD) and a voice activity detection method (including a background noise detection method, a tonality signal detection method, a method for updating the number of current active speech hangover frames in a VAD decision, and a method for adjusting a signal to noise ratio threshold in a VAD decision) and an apparatus, so as to improve the accuracy of a VAD.

To solve the abovementioned technical problem, the present document provides a voice activity detection (VAD) method, and the method comprises:

obtaining sub-band signals and spectrum amplitudes of a current frame;

computing values of a energy feature, a spectral centroid feature and a time-domain stability feature of the current frame according to the sub-band signals; computing values of a spectral flatness feature and a tonality feature according to the spectrum amplitudes;

computing a signal to noise ratio parameter of the current frame according to a background noise energy estimated from a previous frame, a energy of SNR sub-bands and the energy feature of the current frame;

computing a tonality signal flag of the current frame according to the energy feature, the spectral centroid feature, the time-domain stability feature, the spectral flatness feature and the tonality feature of the current frame;

computing a VAD decision result according to the tonality signal flag, the signal to noise ratio parameter, the spectral centroid feature, and the energy feature.

To solve the abovementioned technical problem, the present document provides a voice activity detection (VAD) apparatus, and the apparatus comprises:

a filter bank, used to obtain sub-band signals of a current frame;

a spectrum amplitude computation unit, used to obtain spectrum amplitudes of the current frame;

a feature acquisition unit, used to compute values of a energy feature, a spectral centroid feature and a time-domain stability feature of the current frame according to the sub-band signals; compute values of a spectral flatness feature and a tonality feature according to the spectrum amplitudes;

a flag computation unit, used to compute a tonality signal flag of the current frame according to the energy feature, the spectral centroid feature, the time-domain stability feature, the spectral flatness feature and the tonality feature of the current frame;

a signal to noise ratio computation unit, used to compute a signal to noise ratio parameter of the current frame according to a background noise energy estimated from a previous frame, a energy of SNR sub-bands and the energy feature of the current frame;

a VAD decision unit, used to compute a VAD decision result according to the tonality signal flag, the signal to noise ratio parameter, the spectral centroid feature and the energy feature.

To solve the abovementioned technical problem, the present document provides a background noise detection method, and the method comprises:

obtaining sub-band signals and spectrum amplitudes of a current frame;

computing values of a energy feature, a spectral centroid feature and a time-domain stability feature according to the sub-band signals, and computing values of a spectral flatness feature and a tonality feature according to the spectrum amplitudes;

performing a background noise detection according to the spectral centroid feature, the time-domain stability feature, the spectral flatness feature, the tonality feature, and a current energy feature, and judging whether the current frame is a background noise or not.

To solve the abovementioned technical problem, the present document provides a background noise detection apparatus, and the apparatus comprises:

a filter bank, used to obtain sub-band signals of a current frame;

a spectrum amplitude computation unit, used to obtain spectrum amplitudes of the current frame;

a feature computation unit, used to compute values of a energy feature, a spectral centroid feature and a time-domain stability feature according to the sub-band signals, and compute values of a spectral flatness feature and a tonality feature according to the spectrum amplitudes;

a background noise judgment unit, used to execute a background noise detection according to the spectral centroid feature, the time-domain stability feature, the spectral flatness feature, the tonality feature, and a current energy feature, and judge whether the current frame is a background noise or not.

To solve the abovementioned technical problem, the present document provides a tonality signal detection method, and the method comprises:

obtaining sub-band signals and spectrum amplitudes of a current frame;

computing values of a spectral centroid feature and a time-domain stability feature according to the sub-band signals, and computing values of a spectral flatness feature and a tonality feature according to the spectrum amplitudes;

judging whether the current frame is a tonality signal or not according to the tonality feature, the time-domain stability feature, the spectral flatness feature, and the spectral centroid feature.

To solve the abovementioned technical problem, the present document provides a tonality signal detection apparatus, and the detection apparatus comprises:

a filter bank, used to obtain sub-band signals of a current frame;

a spectrum amplitude computation unit, used to obtain spectrum amplitudes of the current frame;

a feature computation unit, used to compute values of a spectral centroid feature and a time-domain stability feature according to the sub-band signals, and compute values of a spectral flatness feature and a tonality feature according to the spectrum amplitudes;

a tonality signal judgment unit, used to judge whether the current frame is a tonality signal or not according to the tonality feature, the time-domain stability feature, the spectral flatness feature, and the spectral centroid feature.

To solve the abovementioned technical problem, the present document provides a method for updating a number of current active speech hangover frames in a VAD decision, and the method comprises:

computing a long-time signal to noise ratio lt_snr and an average SNR of all sub-bands SNR2_lt_ave;

updating a number of current active speech hangover frames according to a decision result based on a plurality previous frames, the long-time signal to noise ratio lt_snr, the average SNR of all sub-bands SNR2_lt_ave, a signal to noise ratio of the current frame, and a VAD decision result of the current frame.

To solve the abovementioned technical problem, the present document provides an apparatus for updating a number of current active speech hangover frames in a VAD decision, and the update apparatus comprises:

a long-time signal to noise ratio computation unit, used to compute a long-time signal to noise ratio lt_snr;

an average SNR of all sub-bands computation unit, used to compute an average SNR of all sub-bands SNR2_lt_ave;

a unit for updating a number of active speech hangover frames, used to update a number of current active speech hangover frames according to a decision result based on a plurality previous frames, the long-term signal to noise ratio lt_snr, the average SNR of all sub-bands SNR2_lt_ave, a signal to noise ratio parameter of the current frame, and a VAD decision result of the current frame.

To solve the abovementioned technical problem, the present document provides a method for adjusting a signal to noise ratio threshold in a VAD decision, and the method for adjusting comprises:

computing a spectral centroid feature of a current frame according to sub-band signals;

computing a ratio of an average long-time active speech signal energy to an average long-time background noise energy computed from a previous frame to obtain a long-time signal to noise ratio lt_snr;

adjusting the signal to noise ratio threshold in the VAD decision according to the spectral centroid feature, the long-time signal to noise ratio, a number of previous continuous active speech frames, and a number of previous continuous noise frames continuous_noise_num.

To solve the abovementioned technical problem, the present document provides an apparatus for adjusting a signal to noise ratio threshold in a VAD decision, and the apparatus for adjusting comprises:

a feature acquisition unit, used to compute a spectral centroid feature of a current frame according to sub-band signals;

a long-term signal to noise ratio computation unit, used to compute a ratio of an average long-time active speech signal energy to an average long-time background noise energy computed from a previous frame, to obtain a long-time signal to noise ratio lt_snr;

a signal to noise ratio threshold adjustment unit, used to adjust the signal to noise ratio threshold in the VAD decision according to the spectral centroid feature, the long-time signal to noise ratio, a number of previous continuous active speech frames, and a number of previous continuous noise frames continuous_noise_num.

The method and apparatus of the present document overcomes the disadvantages of the existing VAD algorithms, and improves the accuracy of music detection while improving the VAD efficiency in non-stationary noise detection. Using the audio signal processing algorithm of the present VAD can obtain better performance.

PREFERRED EMBODIMENTS OF THE INVENTION

Hereinafter in conjunction with the accompanying drawings in the embodiments of the present document, the technical schemes in the embodiments of the present document will be clearly and completely described. Obviously, the embodiments described herein are merely part of embodiments rather than all the embodiments of the present document. Based on the embodiments of the present document, all other embodiments obtained by those of ordinary skill in the art under the premise that no creative work is made should belong to the protection scope of the present document.

It should be noted that, in the case of no conflict, the embodiments and features in the embodiments of the present application may be combined with each other.

Figure 1:
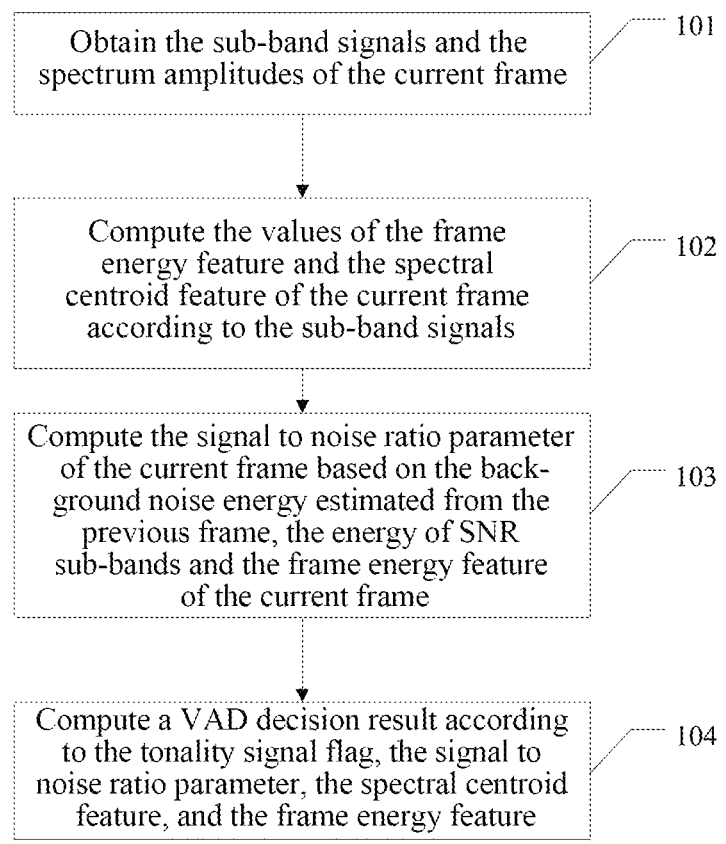
FIG. 1 is a schematic diagram of a first voice activity detection method embodiment in accordance with the present document.

The first voice activity detection (VAD) method embodiment of the present document is shown in FIG. 1 and the method comprises:

In step 101, the sub-band signals and the spectrum amplitudes of the current frame are obtained;

In the present embodiment, an audio stream with a frame length of 20 ms and a sampling rate of 32 kHz is taken as an example to describe specifically. In other frame lengths and sampling rates, the method of the present document is equally applicable.

The current frame time-domain signal is input into a filter bank to perform sub-band filtering computation to obtain filter bank sub-band signals;

a 40-channel filter bank is used in the present embodiment, but the present document is equally applicable to any other filter bank with a different number of channels.

The current frame time-domain signal is input into the 40-channel filter bank to perform sub-band filtering computation, and obtain filter bank sub-band signals $X[k,l]$, $0 \leq k < 40$, $0 \leq l < 16$, with 40 sub-bands on 16 time sampling points, wherein k is a filter bank sub-band index, and its value indicates the sub-band corresponding to the coefficient, l is a time sampling point index of each sub-band, and its implementation steps are as follows:

In 101a, it is to store the latest 640 audio signal samples in a data cache.

In 101b, it is to shift the data in the data cache by 40 positions, and shift the first 40 samples out of the data cache, and store 40 new sample points to the $0^{th}$-$39^{th}$ positions.

It is to multiply the data x in the cache by a window coefficient to obtain an array z, and the computation formula is as follows:

$$z[n]=x[n]\cdot W_{qmf}[n]; 0 \leq n < 640;$$

wherein $W_{qmf}$ is the filter bank window coefficient.

It is to use the following pseudo-codes to compute an 80-point data u,

```
for ( n = 0;  n <80;  n ++)
{  u[n] = 0;
   for ( j = 0;  j <8;  j ++)
   {
      u[n]+ = z[n + j · 80];
   }
}
```

It is to use the following equation to compute arrays r and i:

$$\begin{aligned}r[n] &= u[n] - u[79-n]\\i[n] &= u[n] + u[79-n]\end{aligned}, 0 \leq n \leq 40;$$

It is to use the following equation to compute 40 complex sub-band samples on the first time sample point, $X[k,l]=R(k)+iI(k)$, $0 \leq k < 40$, wherein $R(k)$ and $I(k)$ are respectively real and imaginary parts of the coefficient of the filter bank sub-band signal X on the l-th time sample point, and its computation formula is as follows:

$$\begin{aligned}R(k) &= \sum_{n=0}^{39} r(n)\cos\left[\frac{\pi}{40}\left(k+\frac{1}{2}\right)n\right]\\I(k) &= \sum_{n=0}^{39} i(n)\cos\left[\frac{\pi}{40}\left(k+\frac{1}{2}\right)n\right]\end{aligned}, 0 \leq k < 40$$

In 101c, it is to repeat the computation process in 101b, until all the data of the current frame are filtered through the filter bank, the final output result is the filter bank sub-band signals $X[k,l]$.

In 101d, after completing the above computation process, the filter bank sub-band signals $X[k,l]$, $0 \leq k < 40$, $0 \leq l < 16$ of 40 sub-bands on 16 time sample points are obtained.

Time-frequency transform is performed on the filter bank sub-band signals to obtain the spectrum amplitudes by computation.

Wherein, the embodiments of the present document can be achieved by performing time-frequency transform on all or part of the filter bank sub-bands to compute the spectrum amplitudes. The time-frequency transform method of the present document may be DFT, FFT, DCT or DST. This embodiment uses DFT to illustrate the specific implementation. The computation process is as follows:

16-point DFT transform is performed on data of the 16 time sample points of each filter bank sub-band whose index is 0-9 respectively, and to further improve the spectral resolution, computing the amplitude of each frequency point to obtain the spectrum amplitudes $X_{DFT\_AMP}$.

The time-frequency transform computation equation is as follows:

$$X_{DFT}[k, j] = \sum_{l=0}^{15} X[k,l]\cdot e^{-\frac{2\pi i}{16}jl}; 0 \leq k < 9; 0 \leq j < 16;$$

the process of computing the amplitude on each frequency point is as follows:

first, it is to compute the energy of the array $X_{DFT}[k][j]$ on each point, and the computation equation is as follows:

$X_{DFT\_POW}[k,j]=(\text{real}(X_{DFT}[k,j]))^2+(\text{image}(X_{DFT}[k,j]))^2$; 
$0 \leq k < 10$; $0 \leq j < 16$; wherein, real $(X_{DFT\_POW}[k,j])$ and image $(X_{DFT\_POW}[k,j])$ respectively denote the real and imaginary parts of the spectrum coefficient $X_{DFT\_POW}[k,j]$.

If k is an even number, the following equation is used to compute the spectrum amplitude on each frequency point:

$X_{DFT\_AMP}[8 \cdot k+j] = \sqrt{X_{DFT\_POW}[k,j]+X_{DFT\_POW}[k,15-j]}; 0 \leq k < 10;$
$0 \leq j < 8;$ if k is an odd number, the following equation is used to compute the spectrum amplitude on each frequency point:

$X_{DFT\_AMP}[8 \cdot k+7-j] = \sqrt{X_{DFT\_POW}[k,j]+X_{DFT\_POW}[k,15-j]}; 0 \leq k < 10;$
$0 \leq j < 8;$ $X_{DFT\_AMP}$ is the time-frequency transformed spectrum amplitude.

In Step 102, it is to compute the values of the energy feature and the spectral centroid feature of the current frame according to the sub-band signals;

the values of the energy feature, the spectral centroid feature and the tonality feature can be obtained using an existing technical method, preferably, the parameters are obtained using the following method:

the energy feature is a weighted accumulated value or directly accumulated value of all sub-band signal energies; specifically, a) it is to compute the energy of each filter bank sub-band according to the filter bank sub-band signal $X[k,l]$, and the computation equation is as follows:

$$E_{sb}[k] = \sum_{l=0}^{15} ((\text{real}(X[k,l]))^2 + (\text{image}(X[k,l]))^2); 0 \leq k < 40;$$

b) it is to accumulate the energies of the part with sensitive auditory of the filter bank sub-bands or all of the filter bank sub-bands to obtain the energy feature.

Wherein, according to the psychoacoustic model, the human ear will be relatively insensitive to the sound at extremely low frequencies (such as 100 Hz or less) and high frequencies (such as 20 kHz or more), in accordance with the filter bank sub-bands whose frequencies are from low to high in the present document, from the second sub-band to the last second sub-band, they are major filter bank sub-bands with sensitive auditory, it is to accumulate the energies of some or all of the filter bank sub-bands with sensitive auditory to obtain the energy feature 1, and the computation equation is as follows:

$$E_{t1} = \sum_{n=e\_sb\_start}^{e\_sb\_end} E_{sb}[n];$$

wherein, e_sb_start is the start sub-band index whose value range is [0,6]. e_sb_end is the end sub-band index whose value is greater than 6 and less than the total number of sub-bands.

The energy feature 2 can be obtained by adding the value of the energy feature 1 with the weighted value of energies of some or all of unused filter bank sub-bands when computing the energy feature 1, and its computation equation is as follows:

$$E_{t2} = E_{t1} + \text{e\_scale1} \cdot \sum_{n=0}^{e\_sb\_start-1} E_{sb}[n] + \text{e\_scale2} \cdot \sum_{n=e\_sb\_end+1}^{num\_band} E_{sb}[n];$$

wherein e_scale1 and e_scale2 are weighted scale factors whose value ranges are respectively [0,1]. $num\_band$ is the total number of sub-bands.

The spectral centroid feature can be obtained by computing the ratio of the weighted summation of the energies of sub-bands of the filter bank to the direct summation of the energies of sub-bands of the filter bank or can be obtained by performing smoothing filtering on another spectral centroid feature value.

The spectral centroid feature can be achieved with the following sub-steps:

a: it is to divide the sub-band section which is used to compute the spectral centroid feature as follows:

| spectral centroid number | Spectral centroid start sub-band index spc_start_band | Spectral centroid end sub-band index spc_end_band |
|---|---|---|
| 0 | 0 | 10 |
| 1 | 1 | 24 | b: it is to use the spectral centroid feature computation section division mode in a) and the following formula to compute two spectral centroid feature values, respectively the first-section spectral centroid feature and the second-section spectral centroid feature.

$$\text{sp\_center}[k] = \frac{\sum_{n=0}^{spc\_end\_band(k)-spc\_start\_band(k)} (n+1) \cdot E_{sb}[n+spc\_start\_band(k)] + \text{Delta1}}{\sum_{n=0}^{spc\_end\_band(k)-spc\_start\_band(k)} E_{sb}[n+spc\_start\_band(k)] + \text{Delta2}}; 0 \leq k < 2$$

Delta1 and Delta2 are respectively small offset values in the range of (0,1). Wherein k is the spectral centroid number index.

c: it is to perform smoothing filtering operation on the first-section spectral centroid feature sp_center[0] to obtain a smooth spectral centroid feature value, that is, the smoothly-filtered value of the first-section spectral centroid feature, and the computation process is as follows:

$sp\_\text{center}[2]=sp\_\text{center}_{-1}[2] \cdot spc\_sm\_\text{scale}+sp\_\text{center}[0] \cdot (1-spc\_sm\_\text{scale})$ wherein, spc_sm_scale is the spectral centroid parameter smooth filtering scale factor, $sp\_center_{-1}[2]$ denotes a smooth spectral centroid feature of the previous frame, and its initial value is 1.6.

In Step 103, it is to compute the signal to noise ratio parameter of the current frame based on the background noise energy estimated from the previous frame, the energy of SNR sub-bands and the energy feature of the current frame;

The background noise energy of the previous frame may be obtained with an existing method.

If the current frame is a start frame, the value of the signal to noise ratio sub-band background noise energy is a default initial value. The principle for estimating the signal to noise ratio sub-band background noise energy of the previous frame is the same as that for estimating the signal to noise ratio sub-band background energy of the current frame, and referring to step 207 in the second embodiment below for estimating the signal to noise ratio sub-band background energy of the current frame. Specifically, the signal to noise ratio parameter of the current frame can be computed with a signal to noise ratio computation method in the prior art. Preferably, the following method is used:

first, it is to re-divide the filter bank sub-bands into a plurality signal to noise ratio sub-bands, and the division indexes are as in the following table,

| Sub-band number | Filter band sub-band start index Sub_Start_index | Filter band sub-band end index Sub_end_index |
|---|---|---|
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 8 |
| 8 | 9 | 10 |
| 9 | 11 | 12 |
| 10 | 13 | 16 |
| 11 | 17 | 24 |
| 12 | 25 | 36 |

Secondly, it is to compute energy of each SNR sub-band of the current frame according to the signal to noise ratio sub-band division mode. The computation equation is as follows:

$$E_{sb2}[n] = \sum_{k=Sub\_Start\_index(n)}^{Sub\_end\_index(n)} E_{sb}[k]; 0 \le n < 13;$$

Third, it is to compute the sub-band average signal to noise ratio SNR1 according to the energy of each signal to noise ratio sub-band of the current frame and the background noise energy of each signal to noise ratio sub-band of the previous frame. The computation equation is as follows:

$$SNR1 = \frac{1}{num\_band} \sum_{n=0}^{num\_band-1} \log_2 \frac{E_{sb2}(n)}{E_{sb2\_bg}(n)}$$

Wherein, $E_{sb2\_bg}$ is an estimated background noise energy of each signal to noise ratio sub-band of the previous frame, num_band is the number of signal to noise ratio sub-bands. The principle for obtaining the background noise energy of the signal to noise ratio sub-bands of the previous frame is the same as the principle for obtaining the background energy of the signal to noise ratio sub-bands of the current frame, referring to step 207 in the second embodiment below for the process of obtaining the background energy of the signal to noise ratio sub-bands of the current frame;

finally, it is to compute the signal to noise ratio of all sub-bands SNR2 according to the estimated energy of background noise over all sub-bands of the previous frame and the energy feature of the current frame:

$$SNR2 = \log_2 \frac{E_{t1}}{E_{t\_bg}}$$

Wherein, $E_{t\_bg}$ is an estimated energy of background noise over all sub-bands of the previous frame, and the principle for obtaining the energy of background noise over all sub-bands of the previous frame is the same as that for obtaining the energy of background noise over all sub-bands of the current frame, and referring to step 207 in the second embodiment below for the process of obtaining the energy of background noise over all sub-bands of the current frame;

the signal to noise ratio parameters in the present embodiment comprise the sub-band average signal to noise ratio SNR1 and the signal to noise ratio of all sub-bands SNR2. The energy of background noise over all sub-bands and the background noise energy of each sub-band are referred to as background noise energy.

In Step 104, it is to compute a VAD decision result according to the tonality signal flag, the signal to noise ratio parameter, the spectral centroid feature, and the energy feature.

The Second Embodiment

Figure 2:
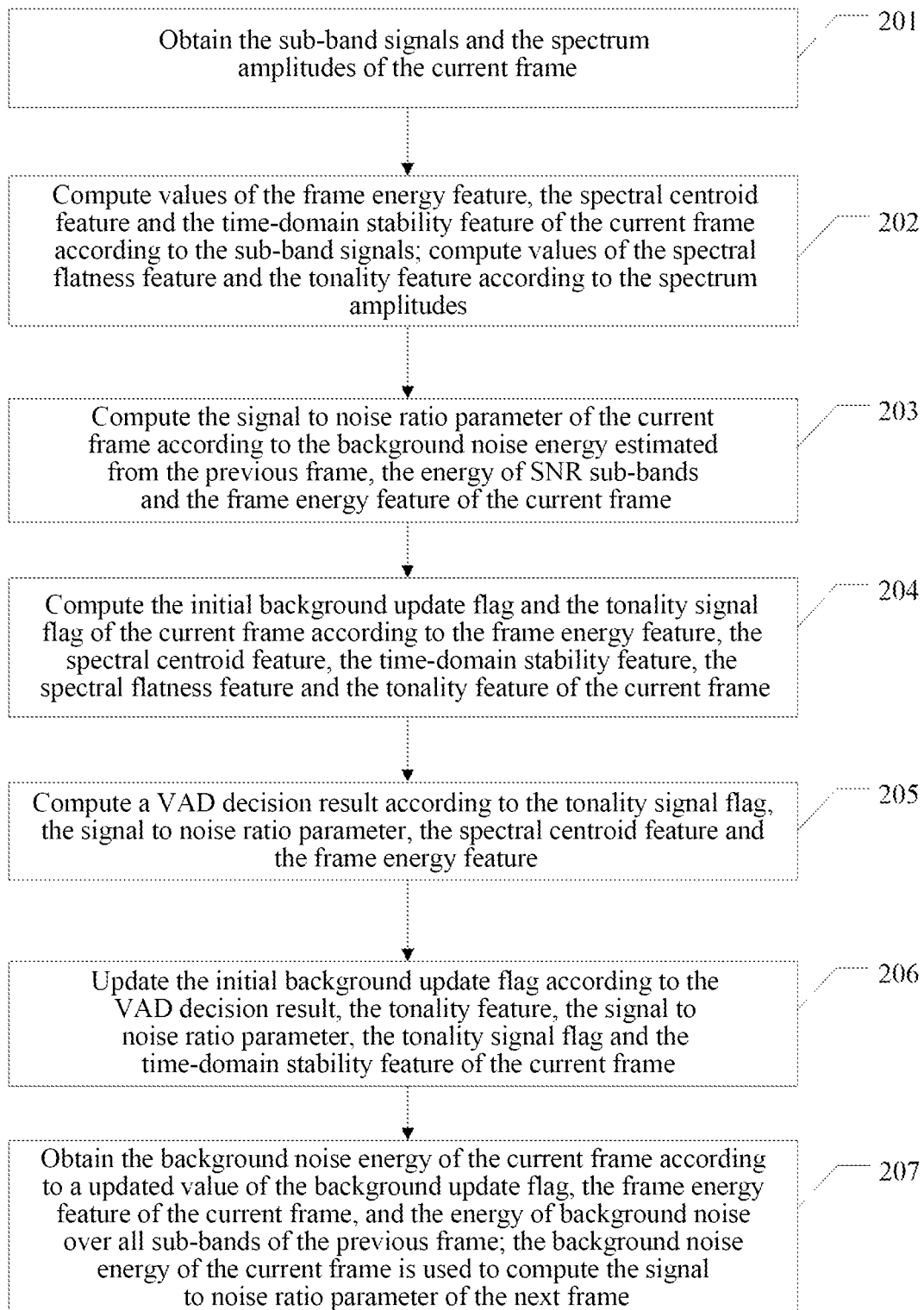
FIG. 2 is a schematic diagram of a second voice activity detection method embodiment in accordance with the present document.

The second VAD method embodiment of the present document performs polyphase filtering on the input audio signal sub-frames to obtain filter bank sub-band signals, and further performs time-frequency transform on the filter bank sub-band signals, and computes the spectrum amplitudes, respectively performs signal feature extraction on each filter bank sub-band signal and the spectrum amplitude to obtain each feature value. It is to compute the background noise flag and the tonality signal flag of the current frame in accordance with the feature values. It is to compute the signal to noise ratio parameter of the current frame according to the energy feature value and the background noise energy of the current frame, and judge whether the current frame is an active speech frame or not according to the computed signal to noise ratio parameter of the current frame, the VAD (Voice Activity Detection) decision result of the previous frame, and each feature. It is to update the background noise flag according to the active speech frame decision result to obtain a new background noise flag. It is to judge whether to update the background noise or not according to the new background noise flag. The specific VAD detection process is as follows:

as shown in FIG. 2, the second method embodiment comprises:

in step 201, it is to obtain the sub-band signals and the spectrum amplitudes of the current frame;

in step 202, it is to compute values of the energy feature, the spectral centroid feature and the time-domain stability feature of the current frame according to the sub-band signals; compute values of the spectral flatness feature and the tonality feature according to the spectrum amplitudes;

the energy feature is the weighted accumulated value or directly accumulated value of all sub-band signal energies;

the spectral centroid feature is the ratio of the weighted accumulated value to the un-weighted accumulated value of all or part of the sub-band signal energies;

specifically, it is to compute the spectral centroid feature according to the energy of each filter bank sub-band, wherein the spectral centroid feature is obtained by computing the ratio of the weighted summation to the direct summation of the energies of sub-bands of the filter bank or obtained by performing smoothing filtering on the other spectral centroid feature values.

The spectral centroid feature can be achieved with the following sub-steps:

a: it is to divide the sub-band section which is used to compute the spectral centroid feature as follows:

| Spectral centroid number | Spectral centroid start sub-band index spc_start_band | Spectral centroid end sub-band index spc_end_band |
|---|---|---|
| 0 | 0 | 10 |
| 1 | 1 | 24 | b: it is to use the spectral centroid feature computing section division mode in a) and the following formula to compute two spectral center of gravity feature values, which are respectively the first-section spectral centroid feature and the second-section of spectral centroid feature.

$$sp\_center[k] = \frac{\sum_{n=0}^{spc\_end\_band(k)-spc\_start\_band(k)}(n+1) \cdot E_{sb}[n+spc\_start\_band(k)] + \text{Delta1}}{\sum_{n=0}^{spc\_end\_band(k)-spc\_start\_band(k)} E_{sb}[n+spc\_start\_band(k)] + \text{Delta2}}; 0 \leq k < 2$$

Delta1 and Delta2 are respectively small offset values in the range of (0,1). Wherein k is the spectral centroid number index.

c: it is to perform smoothing filtering operation on the first-section spectral centroid feature sp_center[0] to obtain a smooth spectral centroid feature value, that is, the smoothly-filtered value of the first-section spectral centroid feature, and the computation process is as follows:

$$sp\_center[2] = sp\_center_{-1}[2] \cdot spc\_sm\_scale + sp\_center[0] \cdot (1 - spc\_sm\_scale)$$

wherein, spc_sm_scale is the spectral centroid parameter smoothing filtering scale factor, sp_center$_{-1}$[2] denotes the smooth spectral centroid feature value of the previous frame, and its initial value is 1.6.

The time-domain stability feature is the ratio of the variance of the amplitude accumulated value to the expectation of the square of the amplitude accumulated value, or the ratio multiplied by a coefficient;

specifically, it is to compute the time-domain stability feature according to the energy features of a plurality latest frame signals. In the present embodiment, the energy features of the latest 40 frame signals are used to compute the time-domain stability feature. The specific computation steps are as follows:

first, it is to compute the energy amplitudes of the latest 40 frame signals, and the computation equation is as follows:

$$Amp_{t1}[n] = \sqrt{E_{t2}(n)} + e\_offset; 0 \leq n < 40;$$

wherein, e_offset is an offset value whose value range is [0, 0.1], secondly, it is to sequentially add the energy amplitudes of neighboring two frames from the current frame to the 40$^{th}$ previous frame to obtain 20 amplitude accumulated values. The specific computation equation is as follows:

$$Amp_{t2}(n) = Amp_{t1}(-2n) + Amp_{t1}(-2n-1); 0 \leq n < 20;$$

wherein, when n=0, $Amp_{t1}$ denotes the energy amplitude of the current frame, and when n<0, $Amp_{t1}$ denotes the energy amplitude of the n-th previous frame of the current frame.

Finally, it is to compute the ratio of the variance to the average energy of the 20 latest amplitude accumulated values to obtain the time-domain stability feature ltd_stable_rate0. The computation equation is as follows:

$$ltd\_stable\_rate0 = \frac{\sum_{n=0}^{19}\left(Amp_{t2}(n) - \frac{1}{20}\sum_{j=0}^{19}Amp_{t2}(j)\right)^2}{\sum_{j=0}^{19}Amp_{t2}(n)^2 + \text{Delta}};$$

The spectral flatness feature is the ratio of the geometric mean to the arithmetic mean of certain spectrum amplitudes, or the ratio multiplied by a coefficient;

specifically, it is to divide the spectrum amplitudes $X_{DFT\_AMP}$ into a plurality frequency bands, and compute the spectral flatness of each frequency band of the current frame to obtain the spectral flatness feature of the current frame.

In the present embodiment, it is to divide the spectrum amplitudes into three frequency bands, and compute the spectral flatness feature of these three frequency bands, and the specific steps are as follows:

first, it is to divide $X_{DFT\_AMP}$ into three frequency bands according to the indexes in the following table.

| Frequency band number Freq_band | Spectral flatness start sub-band index freq_band_start | Spectral flatness end sub-band index freq_band_end |
|---|---|---|
| 0 | 5 | 19 |
| 1 | 20 | 39 |
| 2 | 40 | 64 | second, it is to respectively compute the spectral flatness of each sub-band to obtain the spectral flatness feature of the current frame, the computation equation of each spectral flatness feature value of the current frame is as follows:

$$SMR(k) = \frac{\left(\prod_{n \in Freq\_band(k)} X_{DFT\_AMP}(n)\right)^{1/(freq\_band\_end(k)-freq\_band\_start(k)+1)}}{\frac{1}{freq\_band\_end(k) - freq\_band\_start(k) + 1} \sum_{n \in Freq\_band(k)} X_{DFT\_AMP}(n)};$$

$$0 \leq k < 3$$

finally, it is to perform smoothing filtering on the spectral flatness feature of the current frame to obtain the final spectral flatness feature of the current frame, $$sSMR(k) = smr\_scale \cdot sSMR_{-1}(k) + (1 - smr\_scale) \cdot SMR(k); 0 \leq k < 3$$

wherein smr_scale is the smoothing factor whose value range is [0.6, 1], $sSMR_{-1}(k)$ is the value of the k-th spectral flatness feature of the previous frame.

The tonality feature is obtained by computing the correlation of intra-frame spectral differential coefficients of two neighboring frame signals, or obtained by continuously performing smoothing filtering on the correlation value.

Specifically, the method for computing the correlation value of the intra-frame spectral differential coefficients of two neighboring frame signals is as follows:

It is to compute the tonality feature according to the spectrum amplitudes, wherein the tonality feature can be computed according to all or part of the spectrum amplitudes.

The computation steps thereof are as follows:

a. it its to perform differential operation on part (not less than eight spectral coefficients) or all of the spectrum amplitudes with neighboring spectrum amplitudes, and set the difference result which is less than 0 to 0, to obtain a set of non-negative spectral differential coefficients.

The present embodiment selects the frequency point coefficients whose location indexes are 3-61 for example to compute the tonality feature. The specific process is as follows:

It is to perform differential operation on the neighboring spectrum amplitudes from the frequency point 3 to the frequency point 61, and the equation is as follows:

$$\text{spec\_dif}[n-3] = X_{DFT\_AMP}(n+1) - X_{DFT\_AMP}(n);$$
$$3 \leq n < 62;$$

It is to set variables which are less than zero in spec_dif to zero.

b. it is to compute, in step a), the correlation coefficient of the non-negative spectral differential coefficient of the current frame computed and the non-negative spectral difference coefficient of the previous frame to obtain a first tonality feature value. The computation equation is as follows:

$$\text{tonality\_rate1} = \frac{\sum_{n=0}^{56} \text{spec\_dif}[n] \cdot \text{pre\_spec\_dif}[n]}{\sqrt{\sum_{n=0}^{56} \text{spec\_dif}[n]^2 \cdot \sum_{n=0}^{56} \text{pre\_spec\_dif}[n]^2}}$$

Wherein, pre_spec_dif is the non-negative spectral difference coefficient of the previous frame.

c. it is to perform smoothing operation on the first tonality feature value to obtain the second tonality feature value. The computation equation is as follows:

$$\text{tonality\_rate2} = \text{tonal\_scale} \cdot \text{tonality\_rate2}_{-1} + (1 - \text{tonal\_scale}) \cdot \text{tonality\_rate1}$$

tonal_scale is the tonality feature smoothing factor whose value range is [0.1, 1], $\text{tonality\_rate2}_{-1}$ is the second tonality feature value of the previous frame, and its initial value is in the range of [0,1].

In Step 203, it is to compute the signal to noise ratio parameter of the current frame according to the background noise energy estimated from the previous frame, the energy of SNR sub-bands and the energy feature of the current frame;

In step 204, it is to compute the initial background noise flag and the tonality signal flag of the current frame according to the energy feature, the spectral centroid feature, the time-domain stability feature, the spectral flatness feature and the tonality feature of the current frame;

In step 205, it is to compute a VAD decision result according to the tonality signal flag, the signal to noise ratio parameter, the spectral centroid feature and the energy feature;

specifically, the specific implementation method of the step 205 is described below in conjunction with the description in FIG. 3.

Understandably, the order of the steps prior to the VAD decision in the step 205 is adjustable as long as the parameters therein do not have causal relationship, for example, the step 204 of obtaining the initial background noise flag and the tonality signal flag may be executed before the signal to noise ratio computation step 203.

The initial background noise flag of the current frame needs to be updated and used to compute the signal to noise ratio parameter of the next frame, thereby the operation of obtaining the initial background noise flag of the current frame may be executed after the VAD decision.

In Step 206, it is to update the initial background noise flag according to the VAD decision result, the tonality feature, the signal to noise ratio parameter, the tonality signal flag and the time-domain stability feature of the current frame;

if the signal to noise ratio parameter SNR2 is less than the specified threshold value SNR2_redec_thr1, SNR1 is less than SNR1_redec_thr1, the VAD flag vad_flag equals to 0, the tonality feature tonality_rate2 is less than tonality_rate2_thr1 the tonality signal flag tonality_flag equals to 0, and the time-domain stability feature lt_stable_rate0 is less than lt_stable_rate0_redec_thr1 (set to 0.1), then it is to set the background noise flag to 1.

In Step 207, it is to obtain the background noise energy of the current frame according to a updated value of the background noise flag, the energy feature of the current frame, and the energy of background noise over all sub-bands of the previous frame; the background noise energy of the current frame is used to compute the signal to noise ratio parameter of the next frame.

It is to judge whether to update the background noise or not according to the background noise flag, and if the background noise flag is 1, it is to update the background noise according to the ratio of the estimated energy of background noise over all sub-bands to the current frame signal energy. The background noise energy estimation comprises the sub-band background noise energy estimation and the energy of background noise over all sub-bands estimation.

a. The sub-band background noise energy estimation equation is as follows:

$$E_{sb2\_bg}(k) = E_{sb2\_bg\_pre}(k) \cdot \alpha_{bg\_e} + E_{sb2\_bg}(k) \cdot (1 - \alpha_{bg\_e});$$
$$0 \leq k < num\_sb$$

wherein num_sb is the number of frequency domain sub-bands, $E_{sb2\_bg\_pre}(k)$ denotes the sub-band background noise energy of the k-th signal to noise ratio sub-band of the previous frame.

$\alpha_{bg\_e}$ is the background noise update factor, and its value is determined through the energy of background noise over all sub-bands of the previous frame and the current energy feature. The computation process is as follows:

if the energy of background noise over all sub-bands $E_{t\_bg}$ of the previous frame is less than the energy feature $E_{t1}$ of the current frame, then it is valued as 0.96, otherwise it is valued as 0.95.

b. Energy of background noise over all sub-bands estimation is as follows:

if the background noise flag of the current frame is 1, then it is to update the background noise energy accumulated value $E_{t\_sum}$ and the number of background noise energy accumulated frames $N_{Et\_counter}$, the computation equations are as follow:

$$E_{t\_sum}=E_{t\_sum\_-1}+E_{t1};$$

$$N_{Et\_counter}=N_{Et\_counter\_-1}+1;$$

wherein $E_{t\_sum\_-1}$ is the background noise energy accumulated value of the previous frame, $N_{Et\_counter\_-1}$ is the number of background noise energy accumulated frames computed from the previous frame.

c. The energy of background noise over all sub-bands can be obtained from the ratio of the energy of background noise over all sub-bands accumulated value $E_{t\_sum}$ to the number of accumulated frames $N_{Et\_counter}$:

$$E_{t\_bg} = \frac{E_{t\_sum}}{N_{Et\_counter}}$$

It is to judge whether $N_{Et\_counter}$ equals to 64 or not, if $N_{Et\_counter}$ equals to 64, it is to respectively multiply the background noise energy accumulated value $E_{t\_sum}$ and the number of accumulated frames $N_{Et\_counter}$ by 0.75.

d. It is to adjust the sub-band background noise energy and the background noise energy accumulated value according to the values of the tonality signal flag, the energy feature and the energy of background noise over all sub-bands. The computation process is as follows:

if the tonality signal flag tonality_flag is equal to 1 and the value of the energy feature $E_{t1}$ is less than the value of the background noise energy feature $E_{t\_bg}$ multiplied by a gain factor gain, $$\text{then, } E_{t\_sum}=E_{t\_sum}\cdot\text{gain}+\text{delta}; E_{sb2\_bg}(k)=E_{sb2\_bg}(k)\cdot\text{gain}+\text{delta};$$

wherein, the value range of gain is [0.3, 1].

Figure 3:
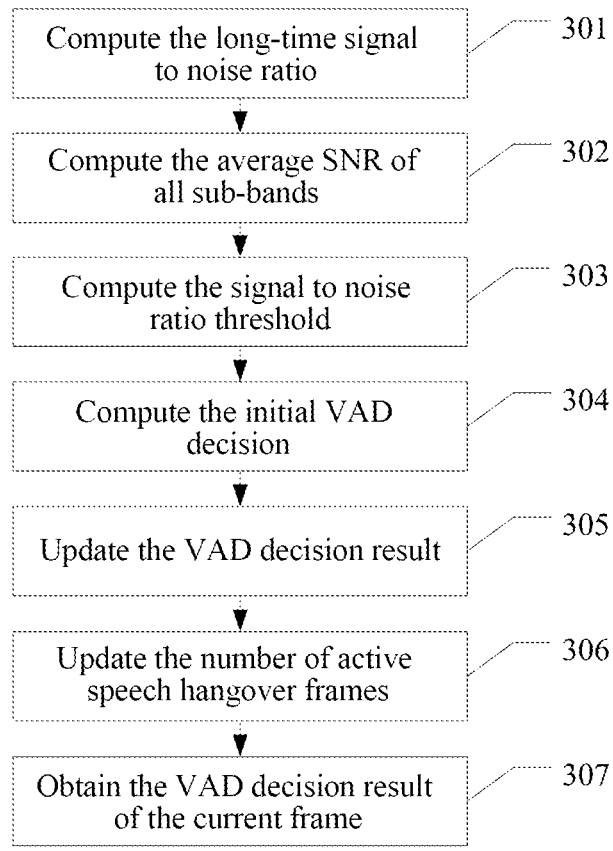
FIG. 3 is a schematic diagram of a process of obtaining a VAD decision result in the first and second embodiments of the present document.

In the first and second embodiments, the process of computing the VAD decision result according to the tonality signal flag, the signal to noise ratio parameter, the spectral centroid feature and the energy feature, as shown in FIG. 3, comprises the following steps:

In step 301, it is to compute the long-time signal to noise ratio lt_snr through the ratio of the average long-time active speech signal energy to the average long-time background noise energy computed from the previous frame;

The computation and definition of the average long-time active speech signal energy $E_{fg}$ and the average long-time background noise energy $E_{bg}$ can refer to step 307. The long-time signal to noise ratio lt_snr computation equation is as follows:

$$\text{lt\_tsnr} = \log_{10}\frac{E_{fg}}{E_{bg}},$$

in this formula, the long-time signal to noise ratio lt_snr is denoted in logarithm.

In Step 302, it is to compute the average value of the signal to noise ratio of all sub-bands $SNR2_s$ of a plurality of latest frames to obtain an average SNR of all sub-bands SNR2_lt_ave;

the computation equation is as follows:

$$SNR2\_lt\_ave = \frac{1}{F\_num}\sum_{n=0}^{F\_num}SNR2(n)$$

SNR2(n) denotes the value of the signal to noise ratio of all sub-bands SNR2 of the n-th previous frame of the current frame, F_num is the total number of frames for computing the average value and its value is in the range of [8,64].

In Step 303, it is to obtain the signal to noise ratio threshold snr_thr in the VAD decision according to the spectral centroid feature, the long-time signal to noise ratio lt_snr, the number of previous continuous active speech frames continuous_speech_num and the number of previous continuous noise frames continuous_noise_num;

the specific implementation steps are as follows:

First, it is to set the initial value of the signal to noise ratio threshold snr_thr, and the value is in the range of [0.1, 2], and preferably is 1.06.

Secondly, it is to adjust the value of the signal to noise ratio threshold snr_thr for the first time according to the spectral centroid feature. The steps are as follows: if the value of the spectral centroid feature sp_center[2] is greater than a specified threshold value spc_vad_dec_thr1 the snr_thr is added with an offset value, and the preferred offset value is taken as 0.05; otherwise, if sp_center[1] is greater than spc_vad_dec_thr2, the snr_thr is added with an offset value, and the preferred offset value is taken as 0.10; otherwise, the snr_thr is added with an offset value, and the preferred offset value is taken as 0.40; wherein the value range of the thresholds spc_vad_dec_thr1 and spc_vad_dec_thr2 is [1.2, 2.5].

Again, it is to adjust the value of the snr_thr for the second time according to the number of previous continuous active speech frames continuous_speech_num, the number of previous continuous noise frames continuous_noise_num, the average SNR of all sub-bands SNR2_lt_ave and the long-time signal to noise ratio lt_snr. If the number of previous continuous speech frames continuous_speech_num is greater than a specified threshold cpn_vad_dec_thr1, the snr_thr is subtracted by 0.2; otherwise, if the number of previous continuous noises continuous_noise_num is greater than a specified threshold cpn_vad_dec_thr2, and SNR2_lt_ave is greater than an offset value plus the long-time signal to noise ratio lt_snr multiplied by the coefficient lt_tsnr_scale, the snr_thr is added with an offset value, and the preferred offset value is taken as 0.1; otherwise, if the continuous_noise_num is greater than a specified threshold cpn_vad_dec_thr3, the snr_thr is added with an offset value, and the preferred offset value is taken as 0.2; otherwise, if the continuous_noise_num is greater than a specified threshold cpn_vad_dec_thr4, then the snr_thr is added with an offset value, the preferred offset value is taken as 0.1. Wherein, the value range of the thresholds cpn_vad_dec_thr1, cpn_vad_dec_thr2, cpn_vad_dec_thr3 and cpn_vad_dec_thr4 is [2, 500], the value range of the coefficient lt_tsnr_scale is [0,2]. The present document can also be realized by even skipping this step and directly proceeding to the final step.

At last, it is to adjust the signal-to-noise ratio threshold snr_thr finally again according to the value of the long-time signal to noise ratio lt_snr, to obtain the signal to noise ratio threshold snr_thr of the current frame.

The update equation is as follows:

$$snr\_thr = snr\_thr + (lt\_tsnr - thr\_offset) \cdot thr\_scale;$$

wherein, thr_offset is an offset value whose value range is [0.5,3]; thr_scale is a gain coefficient whose value range is [0.1, 1].

In Step 304, it is to compute an initial VAD decision based on the VAD decision threshold snr_thr and the SNR parameters SNR1 and SNR2 computed from the current frame;

the computation process is as follows:

if SNR1 is greater than the decision threshold snr_thr, it is to determine that the current frame is an active speech frame, and use the value of the VAD flag vad_flag to indicate whether the current frame is an active speech frame or not, for example, the value 1 is used to indicates that the current frame is an active speech frame in the present embodiment, 0 indicates that the current frame is an inactive speech frame. Otherwise, it is to determine that the current frame is an inactive speech frame, and set the value of the VAD flag vad_flag to 0.

If SNR2 is greater than a specified threshold snr2_thr, it is to determine that the current frame is an active speech frame, and set the value of the VAD flag vad_flag to 1. Wherein, the value range of snr2_thr is [1.2, 5.0]

In Step 305, it is to update the VAD decision result according to the tonality signal flag, the average SNR of all sub-bands SNR2_lt_ave, the spectral centroid and the long-time signal to noise ratio lt_snr;

the specific steps are as follows:

if the tonality signal flag indicates that the current frame is a tonality signal, that is, the tonality_flag is 1, it is to determine that the current frame is an active speech signal, and set the vad_flag to 1.

If the average SNR of all sub-bands SNR2_lt_ave is greater than a specified threshold SNR2_lt_ave_thr1 plus the long-time signal to noise ratio lt_snr multiplied by the coefficient lt_tsnr_tscale, it is to determine that the current frame is as an active speech frame, and set the vad_flag to 1.

Wherein, the value of SNR2_lt_ave_thr1 in the present embodiment is in the range of [1,4], and the value of lt_tsnr_tscale is in the range of [0.1, 0.6].

If the average SNR of all sub-bands SNR2_lt_ave is greater than a specified threshold SNR2_lt_ave_thr2, and the spectral centroid feature sp_center[2] is greater than a specified threshold sp_center_t_thr1 and the long-time signal to noise ratio lt_snr is less than a specified threshold lt_tsnr_t_thr1 it is to determine that the current frame is an active speech frame, and set the flag vad_flag to 1. Wherein, the value of SNR2_lt_ave_t_thr2 is in the range of [1.0, 2.5], the value of sp_center_t_thr1 is in the range of [2.0, 4.0], and the value of lt_tsnr_t_thr1 is in the range of [2.5, 5.0].

If SNR2_lt_ave is greater than a specified threshold SNR2_lt_ave_t_thr3, and the spectral centroid feature sp_center[2] is greater than a specified threshold sp_center_t_thr2 and the long-time signal to noise ratio lt_snr is less than a specified threshold lt_tsnr_t_thr2 it is to determine that the current frame is an active speech frame, and set the flag vad_flag to 1. Wherein, the value of SNR2_lt_ave_t_thr3 is in the range of [0.8,2.0], the value of sp_center_t_thr2 is in the range of [2.0, 4.0], and the value of lt_tsnr_t_thr2 is in the range of [2.5, 5.0].

If SNR2_lt_ave is greater than a specified threshold SNR2_lt_ave_t_thr3, and the spectral centroid feature sp_center[2] is greater than a specified threshold sp_center_t_thr3 and the long-time signal to noise ratio lt_snr is less than a specified threshold lt_tsnr_t_thr3, it is to determine that the current frame is an active speech frame, and set the flag vad_flag to 1. Wherein, the value of SNR2_lt_ave_t_thr4 is in the range of [0.6, 2.0], the value of sp_center_t_thr3 is in the range of [3.0, 6.0], and the value of lt_tsnr_t_thr3 is in the range of [2.5, 5.0].

In Step 306, it is to update the number of active speech hangover frames according to the decision result based on a plurality previous frames, the long-time signal to noise ratio lt_snr, the average SNR of all sub-bands SNR2_lt_ave, the signal to noise ratio parameter of the current frame and the VAD decision result of the current frame;

the specific computation steps are as follows:

the prerequisite of updating the number of current active speech hangover frames is that the active speech flag indicates that the current frame is an active speech frame, if the prerequisite cannot be met, the value of the number of current active speech hangover frames is not updated, and it is to directly proceed to step 307.

The step of updating the number of active speech hangover frames is as follows:

if the number of previous continuous speech frames continuous_speech_num is less than a specified threshold continuous_speech_num_thr1, and lt_tsnr is less than a specified threshold lt_tsnr_h_thr1, the number of current active speech hangover frames num_speech_hangover is equal to the minimum number of continuous active speech frames minus the number of previous continuous speech frames continuous_speech_num; otherwise, if SNR2_lt_ave is greater than a specified threshold SNR2_lt_ave_thr1, and the number of previous continuous speech frames continuous_speech_num is greater than a specified threshold continuous_speech_num_thr2, then the value of the number of active speech hangover frames num_speech_hangover is set according to the magnitude of the long-time signal to noise ratio lt_tsnr otherwise, the value of the number of currently active speech hangover frames num_speech_hangover is not updated. Wherein the minimum value of the number of continuous active speech frames is 8 in this embodiment, and the value can be in the range of [6,20].

The specific steps are as follows:

if the long-time signal to noise ratio lt_snr is greater than 2.6, the value of num_speech_hangover is 3; otherwise, if the long-time signal to noise ratio lt_snr is greater than 1.6, then the value of num_speech_hangover is 4; otherwise, the value of num_speech_hangover is 5.

In Step 307, it is to add an active speech hangover according to the decision result of the current frame and the number of active speech hangover frames to obtain the VAD decision result of the current frame.

The method is:

If the current frame is judged to be a inactive speech frame, that is, the active speech flag is 0, and the number of active speech hangover frames is greater than 0, then it is to add an active speech hangover, i.e., set the active speech flag to 1, and decrement the value of num_speech_hangover by one.

It is to obtain the final VAD decision result of the current frame.

Preferably, after the step 304, it further comprises computing the average long-time active speech signal energy $E_{fg}$ according to the initial VAD decision result; after the step 307, it further comprises computing the average long-time background noise energy $E_{bg}$ based on the VAD decision result, and the computed value is used for the VAD decision of the next frame.

The specific computation process of the average long-time active speech signal energy $E_{fg}$ is as follows:

a). if the VAD initial decision result indicates that the current frame is an active speech frame, that is, the value of the VAD flag is 1, and $E_{t1}$ is several times, which is 6 times in the present embodiment, greater than $E_{bg}$, then it is to update the average long-time active speech energy accumulated value fg_energy and the number of average long-time active speech energy accumulated frames fg_energy_count. The updating method is the fg_energy plus $E_{t1}$ to obtain a new fg_energy. The fg_energy_count is added by 1 to obtain a new fg_energy_count.

b). in order to ensure that the average long-time active speech signal energy can reflect the latest active speech signal energy, if the value of the number of average long-time active speech energy accumulated frames is equal to a certain set value fg_max_frame_num, then both the number of accumulated frames and the accumulated value are multiplied with an attenuation coefficient attenu_coef1 simultaneously. The value of fg_max_frame_num is 512 and the value of attenu_coef1 is 0.75 in this embodiment.

c). it is to divide the average long-time active speech energy accumulated value fg_energy by the number of average long-time active speech energy accumulated frames to obtain the average long-time active speech signal energy, and the computation equation is as follows:

$$E_{fg} = \frac{fg\_energy}{fg\_energy\_count}$$

The method for computing the average long-time background noise energy $E_{bg}$ is:

assuming that bg_energy_count is the number of background noise energy accumulated frames, and it is used to record the energies of how many frames is included in the latest background noise energy accumulated value. The bg_energy is the accumulated value of the latest background noise energies.

a). if determining that the current frame is an inactive speech frame, the value of the VAD flag is 0, and SNR2 is less than 1.0, then it is to update the background noise energy accumulated value bg_energy and the number of background noise energy accumulated frames bg_energy_count. The updating method is to add the background noise energy accumulated value bg_energy with $E_{r1}$ to obtain a new background noise energy accumulated value bg_energy. 1 is added to the number of background noise energy accumulated frames bg_energy_count to obtain the new number of background noise energy accumulated frames bg_energy_count.

b). if the number of background noise energy accumulated frames bg_energy_count is equal to the maximum number of counted frames computed from the average long-time background noise energy, both the number of accumulated frames and the accumulated value are multiplied by the attenuation coefficient attenu_coef2 simultaneously. Wherein, the maximum number of counted frames computed from the average long-time background noise energy is 512 in this embodiment, and the attenuation coefficient attenu_coef2 is equal to 0.75.

c). it is to divide the background noise energy accumulated value bg_energy by the number of background noise energy accumulated frames to obtain the average long-time background noise energy, and the computation equation is as follows:

$$E_{bg} = \frac{bg\_energy}{bg\_energy\_count}$$

Figure 4:
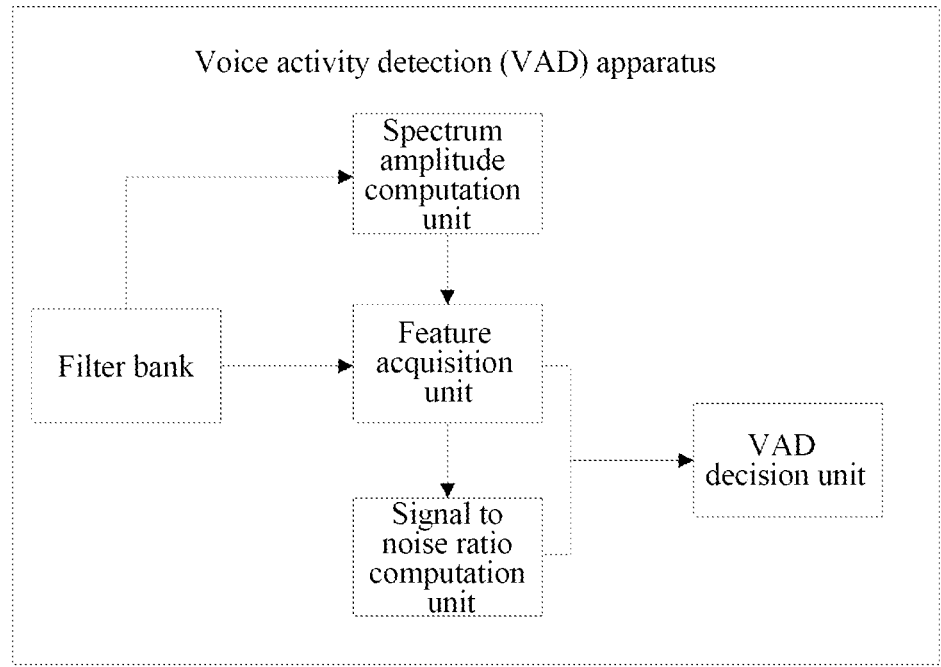
FIG. 4 is a schematic diagram of a module structure of a first voice activity detection (VAD) apparatus embodiment in accordance with the present document.

To achieve the abovementioned first and second voice activity detection method embodiments, the present document further provides a first VAD apparatus embodiment, and as shown in FIG. 4, the apparatus comprises:

a filter bank, used to obtain sub-band signals of a current frame;

a spectrum amplitude computation unit, used to obtain spectrum amplitudes of the current frame;

a feature acquisition unit, used to compute values of a energy feature and a spectral centroid feature of the current frame according to the sub-band signals;

a signal to noise ratio computation unit, used to compute a signal to noise ratio parameter of the current frame according to a background noise energy estimated from a previous frame, a energy of SNR sub-bands and the energy feature of the current frame;

a VAD decision unit, used to compute a VAD decision result according to a tonality signal flag, the signal to noise ratio parameter, the spectral centroid feature and the energy feature.

Corresponding to the second method embodiment, the feature acquisition unit is further used to compute the value of the time-domain stability feature according to the sub-band signals, and used to compute values of the spectral flatness feature and the tonality feature according to the spectrum amplitudes;

the various features can be obtained via the existing methods or the following method:

the energy feature is a weighted accumulated value or direct accumulated value of all sub-band signal energies;

the spectral centroid feature is a ratio of the weighted accumulated value to the un-weighted accumulated value of all or part of sub-band signal energies, or a value obtained by performing smooth filtering on the ratio;

the time-domain stability feature is the ratio of the variance of the amplitude accumulated value to the expectation of the square of the amplitude accumulated value, or the ratio multiplied by a coefficient;

the spectral flatness feature is the ratio of the geometric mean to the arithmetic mean of certain spectrum amplitudes, or the ratio multiplied by a coefficient;

the tonality feature is obtained by computing the correlation value of the intra-frame spectral differential coefficients of two neighboring frame signals, or obtained by continuously performing smooth filtering on the correlation value.

Figure 5:
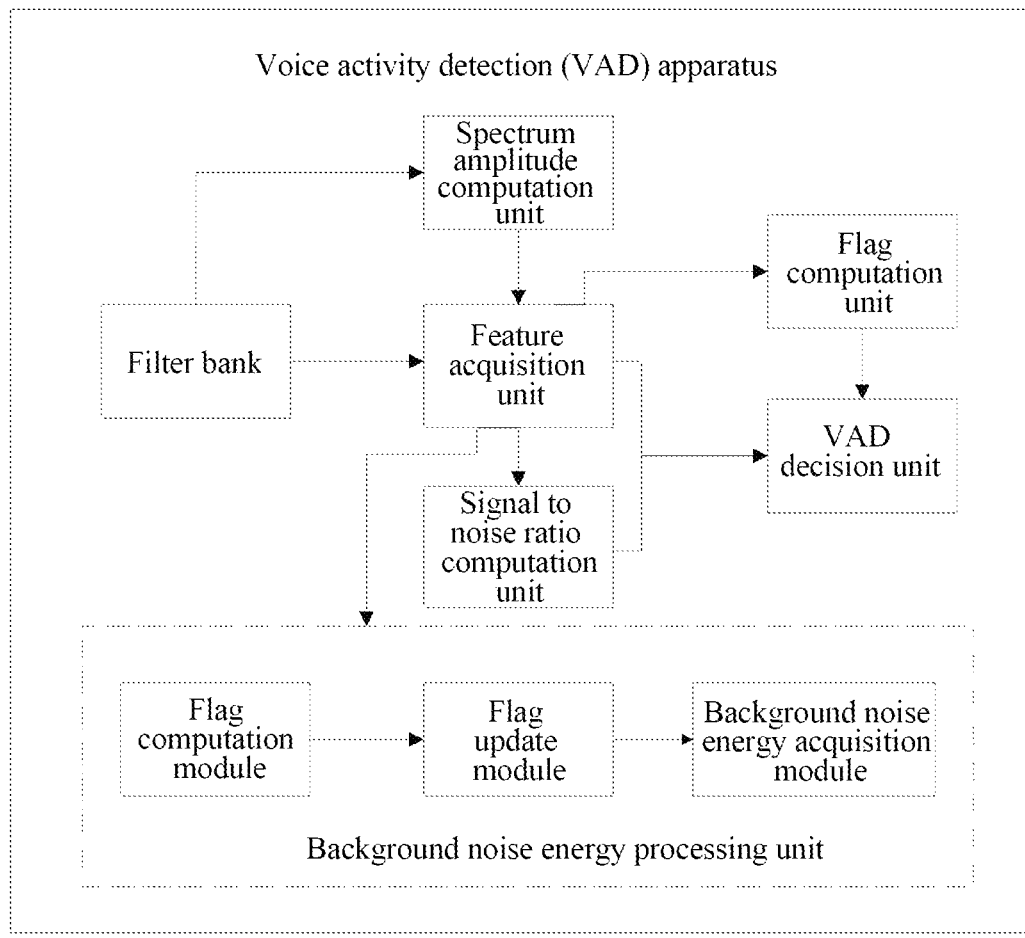
FIG. 5 is a schematic diagram of a module structure of a second voice activity detection (VAD) apparatus embodiment in accordance with the present document.

FIG. 5 shows the second voice activity detection (VAD) apparatus embodiment of the present document, and what is different from the first embodiment is that, the apparatus further comprises a flag computation unit and a background noise energy processing unit, wherein:

the flag computation unit is used to compute the tonality signal flag of the current frame according to the energy feature, the spectral centroid feature, the time-domain stability feature, the spectral flatness feature, and the tonality feature of the current frame;

the background noise energy processing unit comprises:

an flag computation module, used to compute the initial background noise flag of the current frame according to the energy feature, the spectral centroid feature, the time-domain stability feature, the spectral flatness feature and the tonality feature of the current frame;

an flag update module, used to update the initial background noise flag according to the VAD decision result, the tonality feature, the signal to noise ratio parameter, the tonality signal flag and the time-domain stability feature of the current frame;

a background noise energy acquisition module, used to obtain the background noise energy of the current frame according to the updated value of the background noise flag, the energy feature of the current frame and the energy of background noise over all sub-bands of the previous frame, wherein the background noise energy of the current frame is used to compute the signal to noise ratio parameter of the next frame.

Figure 6:
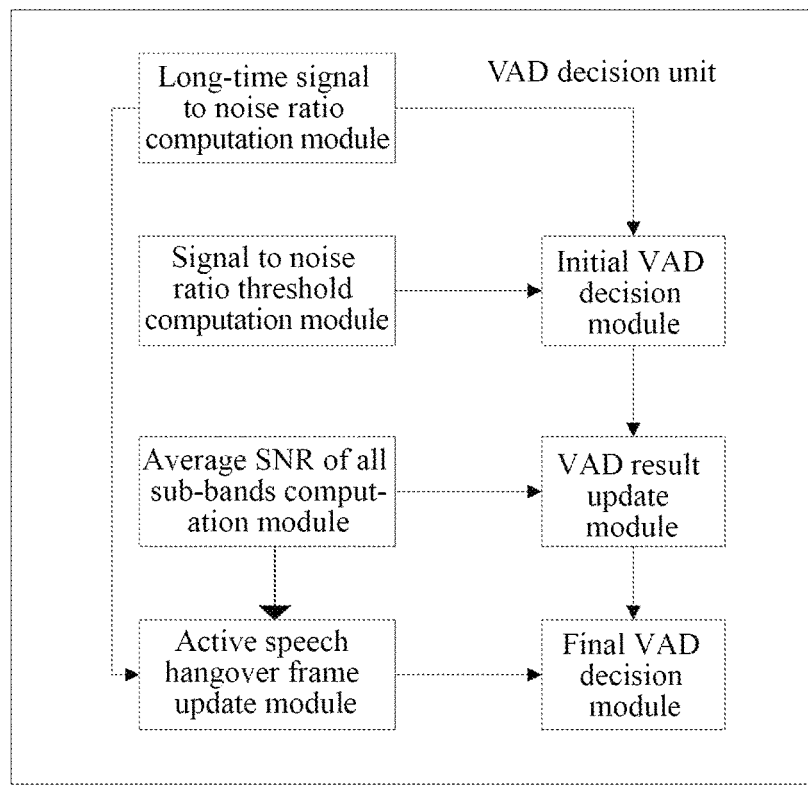
FIG. 6 is a schematic diagram of a module structure of a VAD decision unit in a VAD apparatus in accordance with the present document.

Corresponding to the first and second method embodiments, as shown in FIG. 6, the VAD decision unit comprises:

a long-time signal to noise computation module, used to compute the long-time signal to noise ratio lt_snr through the ratio of the average long-time active speech signal energy to the average long-time background noise energy computed from the previous frame;

an average SNR of all sub-bands computation module, used to compute the average value of the signal to noise ratio of all sub-bands SNR2$_s$ of a plurality latest frames to obtain an average SNR of all sub-bands SNR2_lt_ave;

a signal to noise ratio threshold computation module, used to obtain the signal to noise ratio threshold snr_thr in the VAD decision based on the spectral centroid feature, the long-time signal to noise ratio lt_snr, the number of previous continuous active speech frames continuous_speech_num and the number of previous continuous noise frames continuous_noise_num;

an initial VAD decision module, used to compute the initial VAD decision according to the VAD decision threshold snr_thr and the signal to noise ratio parameters SNR1 and SNR2 computed from the current frame;

a VAD result update module, used to update the VAD decision result according to the tonality signal flag, the average SNR of all sub-bands SNR2_lt_ave, the spectral centroid and the long-time signal to noise ratio lt_snr;

an active speech hangover frame update module, used to update to obtain the number of the active speech hangover frames according to the decision result based on a plurality previous frames, the long-time signal to noise ratio lt_snr, the average SNR of all sub-bands SNR2_lt_ave, the signal to noise ratio of the current frame and the VAD decision result of the current frame;

a VAD decision module, used to add an active speech hangover in accordance with the decision result of the current frame and the number of active speech hangover frames to obtain the VAD decision result of the current frame.

More preferably, the VAD decision unit further comprises: an energy computation module, used to compute the average long-time active speech signal energy $E_{fg}$ according to the VAD decision result; and update the average long-time background noise energy $E_{bg}$ in accordance with the VAD decision result, wherein the updated value is used for the VAD decision of the next frame.

Figure 7:
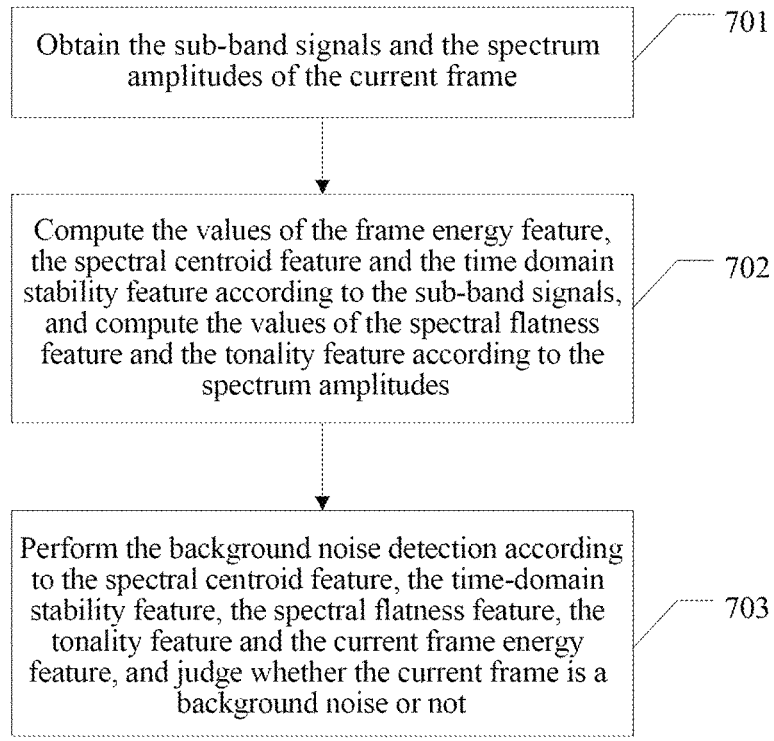
FIG. 7 is a schematic diagram of a background noise detection method embodiment in accordance with the present document.

The present document further provides a background noise detection method embodiment, and as shown in FIG. 7, the method comprises:

In step 701, it is to obtain the sub-band signals and the spectrum amplitudes of the current frame;

In step 702, it is to compute the values of the energy feature, the spectral centroid feature and the time domain stability feature according to the sub-band signals, compute the values of the spectral flatness feature and the tonality feature according to the spectrum amplitudes;

preferably, the energy feature is a weighted accumulated value or a directly accumulated value of all sub-band signal energies.

the spectral centroid feature is the ratio of the weighted accumulated value to the un-weighted accumulated value of all or part of the sub-band signal energies, or a value obtained by performing smooth filtering on the ratio.

The time-domain stability parameter is the ratio of the variance of the frame energy amplitude to the expectation of the square of the amplitude accumulated value, or the ratio multiplied by a coefficient.

The spectral flatness parameter is the ratio of the geometric mean to the arithmetic mean of certain spectrum amplitudes, or the ratio multiplied by a coefficient.

Specifically, steps 701 and 702 are the same with those in the above description and are not discussed here.

In Step 703, it is to perform the background noise detection according to the spectral centroid feature, the time-domain stability feature, the spectral flatness feature, the tonality feature and the current energy feature, and judge whether the current frame is a background noise or not.

Preferably, it is to determine that the current frame is not a noise signal when determining that any of the following conditions is satisfied:

the time-domain stability parameter lt_stable_rate0 is greater than a specified threshold;

a value of a smoothly-filtered first-section spectral centroid feature is greater than a specified threshold value, and the time-domain stability feature value is also greater than a specified threshold value;

a value of the tonality feature or a value of the smoothly-filtered tonality feature is greater than a specified threshold value, and the value of the time domain stability feature lt_stable_rate0 is greater than the specified threshold thereof;

a value of the spectral flatness feature of each sub-band or a value of the smoothly-filtered spectral flatness feature of each sub-band is less than a corresponding specified threshold value thereof;

or, it is determined that the value of the energy feature $E_{t1}$ is greater than the specified threshold value E_thr1.

Specifically, assume that the current frame is a background noise.

In this embodiment, a background noise flag background_flag is used to indicate whether the current frame is a background noise or not, and it is agreed that if determining that the current frame is a background noise, the background noise flag background_flag is set to 1, otherwise the background noise flag background_flag is set to 0.

It is detected whether the current frame is a noise signal or not according to the time-domain stability feature, the spectral centroid feature, the spectral flatness feature, the tonality feature, and the energy feature of the current frame. If it is not a noise signal, the background noise flag background_flag is set to zero.

The specific process is as follows:

It is to judge whether the time-domain stability parameter lt_stable_rate0 is greater than a specified threshold lt_stable_rate_thr1 or not. If yes, it is determined that the current frame is not the noise signal, and the background_flag is set to 0. The threshold value in the present embodiment is in the range of [0.8,1.6];

It is to judge whether the smoothed spectral centroid feature value is greater than the specified threshold sp_center_thr1 and the time-domain stability feature value is also greater than the specified threshold lt_stable_rate_thr2 or not. If yes, it is determined that the current frame is not a noise signal, and the background_flag is set to 0. The value range of sp_center_thr1 is [1.6, 4]; the value range of lt_stable_rate_thr2 is (0, 0.1).

It is to judge whether the value of the tonality feature tonality_rate2 is greater than the specified threshold tonality_rate_thr1 or not, and whether the value of the time domain stability feature lt_stable_rate0 is greater than the specified threshold value lt_stable_rate_thr3 or not, if the above conditions are true simultaneously, it is determined that the current frame is not background noise, and the background_flag is set to 0. The value of the threshold tonality_rate_thr1 is in the range of [0.4, 0.66]. The value of the threshold lt_stable_rate_thr3 is in the range of [0.06, 0.3].

It is to judge whether the value of the spectral flatness feature sSMR[0] less than the i specified threshold value sSMR_thr1 or not, judge whether the value of the spectral flatness feature sSMR[1] is less than the specified threshold sSMR_thr2 or not, judge whether the value of the spectral flatness feature sSMR[2] is less than the specified threshold sSMR_thr3 or not. If the abovementioned conditions are true at the same time, then it is determined that the current frame is not background noise. The background_flag is set to zero. The value range of the thresholds sSMR_thr1, sSMR_thr2 and sSMR_thr3 is [0.88, 0.98]. it is to judge whether the value of the flatness feature sSMR[0] is less than the specified threshold value sSMR_thr4 or not, judge whether the value of the spectral flatness feature sSMR[1] is less than the specified threshold value sSMR_thr5 or not, judge whether the value of the spectral flatness feature sSMR[1] is less than the specified threshold sSMR_thr6 or not. If any of the above conditions is true, it is determined that the current frame is not background noise. The background—flag sSMR flag is set to zero. The value range of thr4, sSMR_thr5 and sSMR_thr6 is [0.80, 0.92].

It is to judge whether the value of the energy feature $E_{r1}$ is greater than the specified threshold E_thr1 or not, if the abovementioned condition is true, it is determined that the current frame is not background noise. The background_flag is set to zero. E_thr1 is valued according to the dynamic range of the energy feature.

If the current frame is not detected as being not background noise, then it is indicated that the current frame is a background noise.

Figure 8:
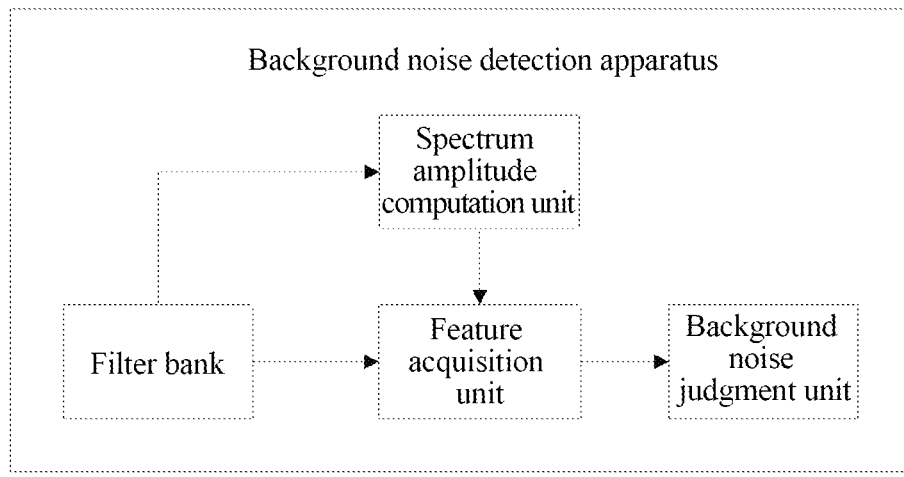
FIG. 8 is a schematic diagram of a module structure of a background noise detection apparatus in accordance with the present document.

Corresponding to the abovementioned method, the present document further provides a background noise detection apparatus, and as shown in FIG. 8, the apparatus comprises:

a filter bank, used to obtain sub-band signals of the current frame;

a spectrum amplitude computation unit, used to obtain the spectrum amplitudes of the current frame;

a feature computation unit, used to compute values of the energy feature, the spectral centroid feature and the time domain stability feature according to the sub-band signal, and compute values of the spectral flatness feature and the tonality feature according to the spectrum amplitudes;

preferably, the energy feature is a weighted accumulated value or a directly accumulated value of all sub-band signal energies;

the spectral centroid feature is the ratio of the weighted accumulated value to an un-weighted accumulated value of all or part of sub-band signal energies, or is a value obtained by performing smooth filtering on the ratio;

the time-domain stability parameter is the ratio of a variance of the frame energy amplitude to an expectation of the square of the amplitude accumulated value, or the ratio multiplied by a coefficient;

the spectral flatness parameter is the ratio of a geometric mean to an arithmetic mean of certain spectrum amplitudes, or the ratio multiplied by a coefficient;

a background noise judgment unit, used to perform background noise detection according to the spectral centroid feature, the time-domain stability feature, the spectral flatness feature, the tonality feature and the current energy feature, and judge whether the current frame is a background noise or not.

Preferably, the background noise judgment unit determines that the current frame is not the noise signal when determining that any of the following conditions is satisfied:

the time-domain stability parameter lt_stable_rate0 is greater than a specified threshold;

a value of a smoothly-filtered first-section spectral centroid feature is greater than a specified threshold value, and the value of the time-domain stability feature is greater than a certain specified threshold value;

a value of the tonality feature or a value of the smoothly-filtered tonality feature is greater than a specified threshold, and the value of the time domain stability feature lt_stable_rate0 is greater than its specified threshold;

a value of the spectral flatness feature of each sub-band or a value of the smoothly-filtered spectral flatness feature of each sub-band is less than a corresponding specified threshold thereof;

or, it is determined that the value of the energy feature $E_{r1}$ is greater than a specified threshold value E_thr1.

Figure 9:
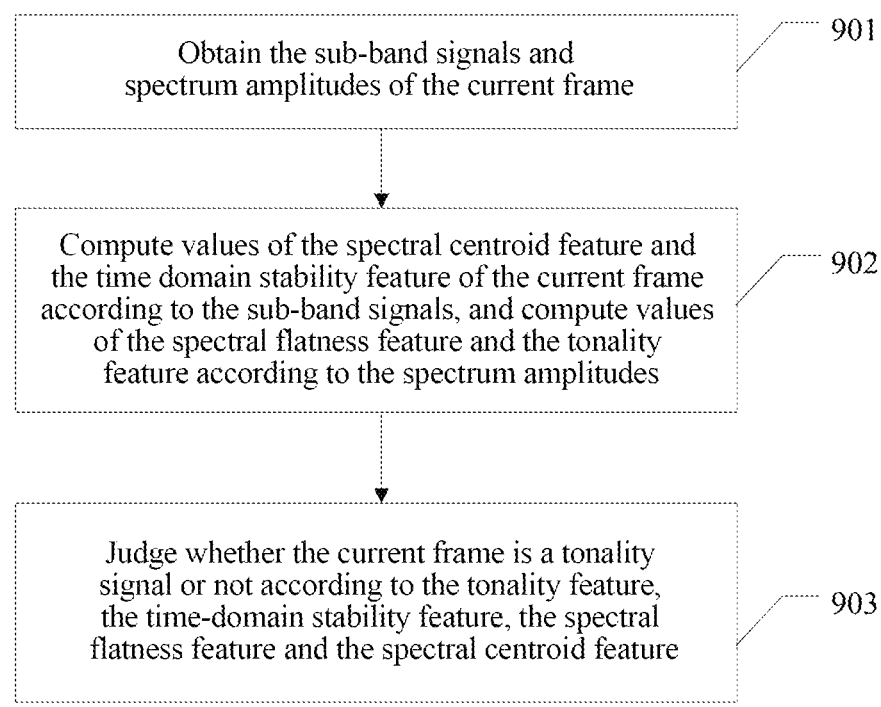
FIG. 9 is a schematic diagram of a tonality signal detection method embodiment in accordance with the present document.

The present document further provides a tonality signal detection method, and as shown in FIG. 9, the method comprises:

In step 901, it is to obtain the sub-band signals and spectrum amplitudes of the current frame;

In step 902, it is to compute values of the spectral centroid feature and the time domain stability feature of the current frame according to the sub-band signals, and compute values of the spectral flatness feature and the tonality feature according to the spectrum amplitudes;

preferably, the spectral centroid feature is the ratio of the weighted accumulated value to the un-weighted accumulated value of all or part of the sub-band signal energies, or a value obtained by performing smooth filtering on the ratio;

the time-domain stability feature is the ratio of a variance of the amplitude accumulated value to an expectation of the square of the amplitude accumulated value, or the ratio multiplied by a coefficient;

the spectral flatness feature is the ratio of a geometric mean to an arithmetic mean of certain spectrum amplitudes, or the ratio multiplied by a coefficient;

the tonality feature is obtained by computing the correlation value of the intra-frame spectral differential coefficients of two neighboring frame signals, or a value obtained by continuously performing smooth filtering on the correlation value.

In Step 903, it is to judge whether the current frame is a tonality signal or not according to the tonality feature, the time-domain stability feature, the spectral flatness feature and the spectral centroid feature.

When judging whether it is a tonality signal or not in step 903, the following operations are performed:

A) it is to assume that the current frame signal is a non-tonality signal, and use a tonality frame flag tonality_frame to indicate whether the current frame is a tonality frame or not.

The value of the tonality_frame in the present embodiment being 1 indicates that the current frame is a tonality frame, and it being 0 indicates that the current frame is a non-tonality frame.

B) It is to judge whether the value of the tonality feature tonality_rate1 or a value of the smoothly-filtered tonality feature tonality_rate2 is greater than the corresponding specified threshold tonality_decision_thr1 or tonality_decision_thr2 or not, if any of the abovementioned conditions is true, it is to proceed to step C), otherwise it is to proceed to step D);

wherein, the value range of tonality_decision_thr1 is [0.5, 0.7], and the value range of tonality_rate1 is [0.7, 0.99].

C. if the value of the time domain stability feature lt_stable_rate0 is less than a specified threshold lt_stable_decision_thr1; the value of the spectral centroid feature sp_center[1] is greater than a specified threshold spc_decision_thr1, and the spectral flatness feature of each sub-band is less than its corresponding pre-specified threshold value, specifically, the spectral flatness feature sSMR[0] is less than a specified threshold value sSMR[0] sSMF_decision_thr1 or sSMR[1] is less than a specified threshold value sSMF_decision_thr2 or sSMR[2] or is less than a specified threshold value sSMF_decision_thr3; then it is determined that the current frame is a tonality frame, and the tonality frame flag tonality_frame is set to 1, otherwise it is determined that it is a non-tonality frame, and the tonality frame flag tonality_frame is set to 0. And it is to proceed to step D;

Wherein, the value range of the threshold lt_stable_decision_thr1 is [0.01, 0.25], the value range of the spc_decision_thr1 [is 1.0, 1.8], the value range of the sSMF_decision_thr1 is [0.6, 0.9], the value range of the sSMF_decision_thr2 is [0.6, 0.9] and the value range of the sSMF_decision_thr3 is [0.7, 0.98].

D) it is to update the tonality degree feature tonality_degree according to the tonality frame flag tonality_frame, wherein the initial value of the tonality degree parameter tonality_degree is set when the voice activity detection apparatus starts to work, and its value range is [0, 1]. Under different circumstances, the method for computing the tonality degree features tonality_degree is different:

if the current tonality frame flag indicates that the current frame is a tonality frame, the following equation is used to update the tonality degree feature tonality_degree:

$$\text{tonality\_degree} = \text{tonality\_degree}_{-1} \cdot td\_scale\_A + td\_scale\_B;$$

wherein, tonality—degree$_{-1}$ is the tonality degree feature of the previous frame whose initial value is in the range of [0,1]. td_scale_A is the attenuation coefficient whose value is in the range of [0,1]; td_scale_B is the accumulation coefficient whose value is in the range of [0,1].

E) it is to judge whether the current frame is a tonality signal or not according to the updated tonality degree feature tonality_flag, and set the value of the tonality signal flag tonality_flag.

Specifically, if the tonality degree feature tonality_degree is greater than a certain specified threshold value, it is determined that the current frame is a tonality signal, otherwise, it is determined that the current frame is a non-tonality signal.

Figure 10:
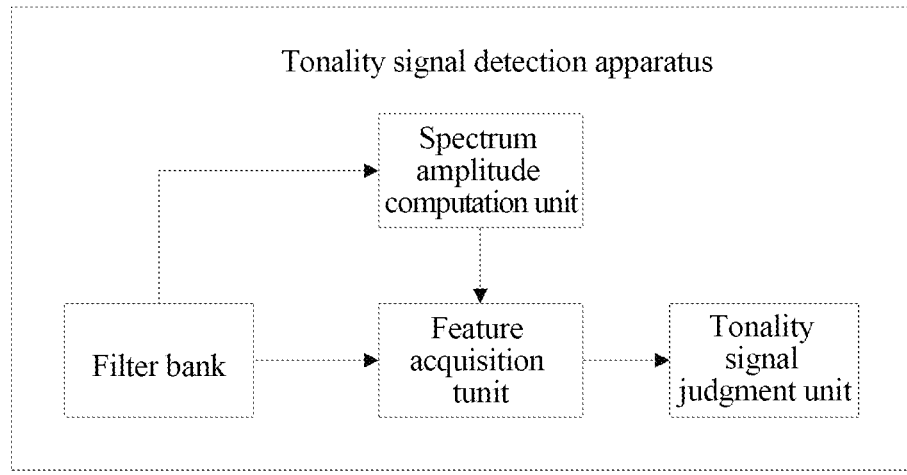
FIG. 10 is a schematic diagram of a module structure of a tonality signal detection apparatus in accordance with the present document.

Corresponding to the aforementioned tonality signal detection method, the present document further provides a tonality signal detection apparatus, and as shown in FIG. 10, the detection apparatus comprises:

a filter bank, used to obtain sub-band signals of the current frame;

a spectrum amplitude computation unit, used to obtain the spectrum amplitudes of the current frame;

a feature computation unit, used to compute values of the current spectral centroid feature and the time domain stability feature according to the sub-band signals, and compute values of the spectral flatness feature and the tonality feature according to the spectrum amplitudes;

as above mentioned, the spectral centroid feature is the ratio of the weighted accumulated value to the un-weighted accumulated value of all or part of sub-band signal energies, or a value obtained by performing smooth filtering on the ratio;

the time-domain stability feature is the ratio of the variance of the amplitude accumulated value to the expectation of the square of the amplitude accumulated value, or the ratio multiplied by a coefficient;

the spectral flatness feature is the ratio of the geometric mean to the arithmetic mean of certain spectrum amplitudes, or the ratio multiplied by a coefficient;

the tonality feature is obtained by computing the correlation value of the intra-frame spectral differential coefficients of two neighboring frame signals, or obtained by continuously performing smooth filtering on the correlation value;

a tonality signal judging unit, used to judge whether the current frame is a tonality signal or not according to the tonality feature, the time-domain stability feature, the spectral flatness feature, and the spectral centroid feature.

Figure 11:
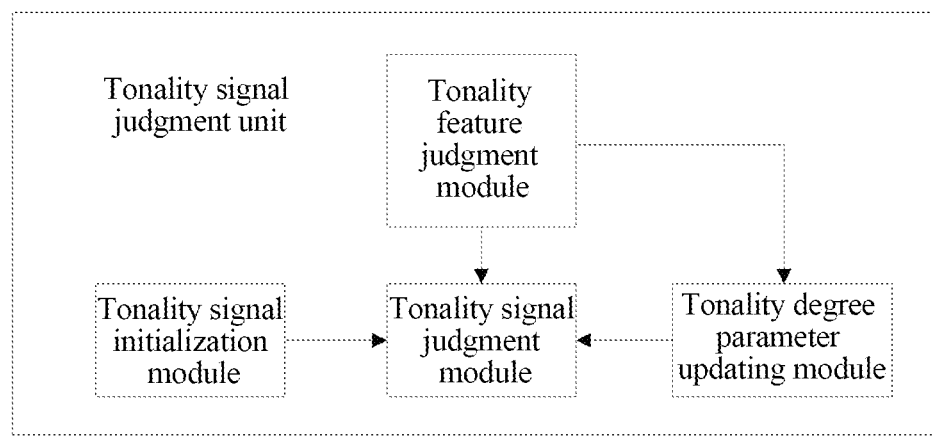
FIG. 11 is a schematic diagram of a module structure of a tonality signal judgment unit in a tonality signal detection apparatus in accordance with the present document.

As shown in FIG. 11, the tonality signal judgment unit comprises:

a tonality signal initialization module, used to set the current frame signal as a non-tonality signal, and use a tonality frame flag tonality_frame to indicate whether the current frame is a tonality frame or not;

a tonality feature judgment module, used to judge whether the value of the tonality feature tonality_rate1 or the value of the smoothly-filtered tonality feature tonality_rate2 is greater than the corresponding specified threshold or not;

a tonality signal judgment module, used to determine that the current frame is a tonality frame when the tonality feature judgment module judges as true, and if the time-domain stability feature value is less than a specified threshold value, the spectral centroid feature value is greater than a specified threshold, and the spectral flatness feature of each sub-band is less than its corresponding pre-specified threshold; judge whether the current frame is a tonality signal frame or not according to the computed tonality degree feature tonality_degree, and judge whether the current frame is a tonality signal or not according to the updated tonality degree feature tonality_degree when the tonality feature judgment module judges as no, and set the value of the tonality signal flag tonality_flag;

a tonality degree parameter updating module, used to update the tonality degree feature tonality_degree according to the tonality frame flag when both the value of the tonality feature tonality_rate1 and the value of the smoothly-filtered tonality feature tonality_rate2 are less than corresponding specified thresholds thereof, wherein the initial value of the tonality degree parameter tonality_degree is set when the voice activity detection apparatus starts to work.

Specifically, if the current tonality frame flag indicates that the current frame is a tonality frame, the tonality degree parameter updating module uses the following equation to update the tonality degree feature tonality_degree:

$$\text{tonality\_degree} = \text{tonality\_degree}_{-1} \cdot td\_scale\_A + td\_scale\_B;$$

wherein, tonality_degree$_{-1}$ is the tonality degree feature of the previous frame whose initial value is in the range of [0,1]. td_scale_A is the attenuation coefficient whose value is in the range of [0,1]; td_scale_B is the accumulation coefficient whose value is in the range of [0,1].

If the tonality degree feature tonality_degree is greater than a specified threshold, then the tonality signal judgment module judges that the current frame is a tonality signal, otherwise, it judges that the current frame is a non-tonality signal.

Specifically, if the tonality degree feature tonality_degree is greater than the threshold of 0.5, it is to judge that the current frame is a tonality signal and set the value of tonality signal flag tonality_flag to 1; otherwise, it is to judge that the current frame is a non-tonality signal, and set the value to 0. The value of the threshold of the tonality signal decision is in the range of [0.3, 0.7].

Figure 12:
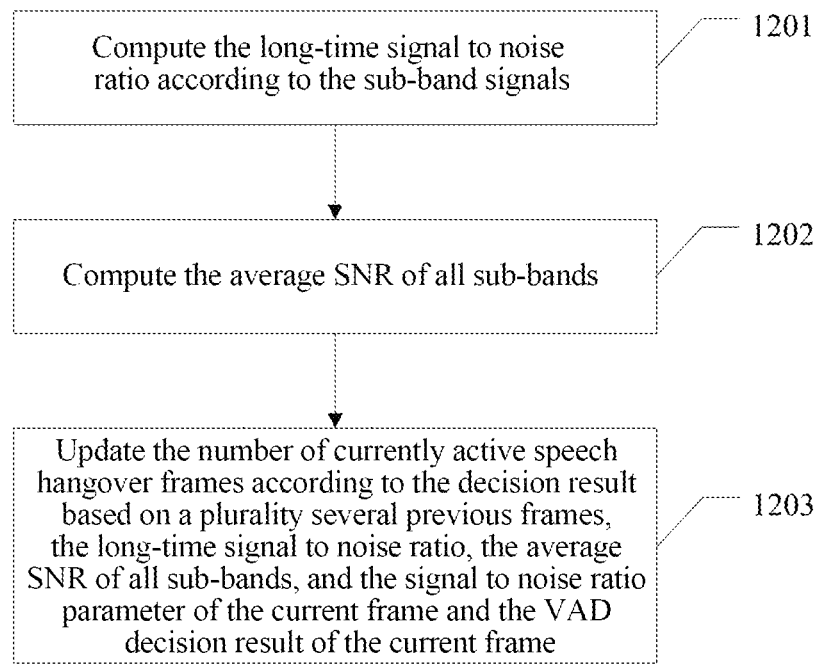
FIG. 12 is a schematic diagram of an embodiment of a method for updating the number of current active speech hangover frames in a VAD decision in accordance with the present document.

The present document further provides a method for updating the number of active speech hangover frames in a VAD decision, and as shown in FIG. 12, the method comprises:

In step 1201, it is to compute the long-time signal to noise ratio lt_snr according to the sub-band signals;

specifically, it is to compute the long-time signal to noise ratio lt_snr according to the ratio of the average long-time active speech signal energy to the average long-time background noise energy computed through the previous frame; the long-time signal to noise ratio can be indicated in logarithm.

In step 1202, it is to compute the average SNR of all sub-bands SNR2_lt_ave;

It is to compute the average value of the signal to noise ratio of all sub-bands SNR2$_s$ of a plurality latest frames to obtain the average SNR of all sub-bands SNR2_lt_ave;

In step 1203, it is to update the number of currently active speech hangover frames according to the decision result based on a plurality previous frames, the long-time signal to noise ratio lt_snr, the average SNR of all sub-bands SNR2_lt_ave, and the signal to noise ratio parameter of the current frame and the VAD decision result of the current frame.

Understandably, the prerequisite of updating the number of currently active speech hangover frames is that the active speech flag indicates that the current frame is an active speech frame.

Preferably, when updating the number of current active speech hangover frames, if the number of previous continuous speech frames is less than the specified threshold value 1, and the long-time signal to noise ratio lt_snr is less than the specified threshold 2, the number of current active speech hangover frames is equal to the minimum number of continuous active speech frames minus the number of previous continuous speech frames; otherwise, if the average SNR of all sub-bands SNR2_lt_ave is greater than the specified threshold 3, and the number of previous continuous speech frames is greater than the specified threshold value 4, then the value of the number of active speech hangover frames is set according to the magnitude of the long-time signal to noise ratio, otherwise, the value of the number of current active speech hangover frames num_speech_hangover is not updated.

Figure 13:
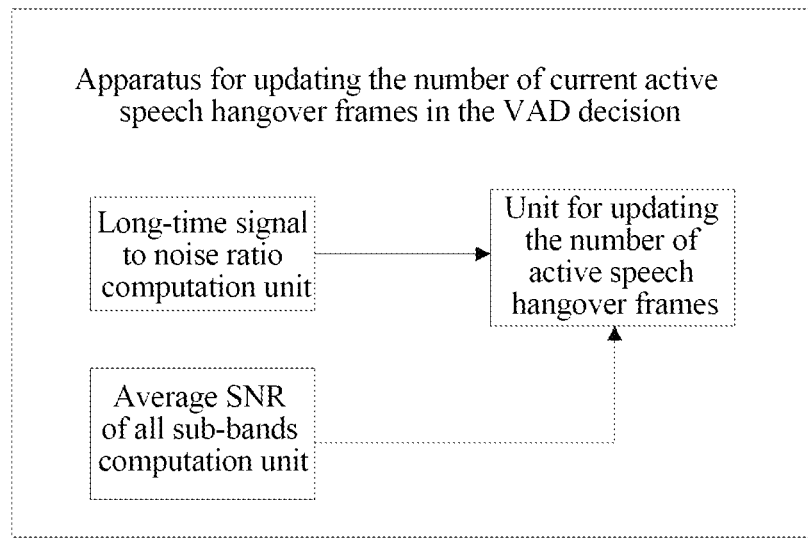
FIG. 13 is a schematic diagram of a module structure of an apparatus for updating the number of current active speech hangover frames in a VAD decision in accordance with the present document.

Corresponding to the aforementioned method for updating the number of active speech hangover frames, the present document further provides an apparatus for updating the number of active speech hangover frames in a VAD decision, and as shown in FIG. 13, the update apparatus comprises:

a long-time signal to noise ratio computation unit, used to compute the long-time signal to noise ratio lt_snr;

specifically, the long-time signal to noise ratio computation unit computes the long-time signal to noise ratio lt_snr through the ratio of the average long-time active speech signal energy to the average long-time background noise energy computed from the previous frame;

an average SNR of all sub-bands computation unit, used to compute the average SNR of all sub-bands SNR2_lt_ave;

specifically, the average SNR of all sub-bands computation unit computes the average value of the SNR of all sub-bands of a plurality latest frames to obtain the average SNR of all sub-bands SNR2_lt_ave;

a unit for updating the number of active speech hangover frames, used to update the number of current active speech hangover frames according to the decision result based on a plurality previous frames, the long-time signal to noise ratio lt_snr, the average SNR of all sub-bands SNR2_lt_ave, the signal to noise ratio parameter of the current frame and the VAD decision of the current frame.

As described above, the prerequisite of updating the number of currently active speech hangover frames is that the active speech flag indicates that the current frame is an active speech frame.

Preferably, when the unit for updating the number of active speech hangover frames updates the number of currently active speech hangover frames, if the number of previous continuous speech frames is less than the specified threshold value 1, and the long-time signal to noise ratio is less than the specified threshold value 2, the number of currently active speech hangover frames is equal to the minimum number of continuous active speech frames minus the number of previous continuous speech frames, otherwise, if the average SNR of all sub-bands SNR2_lt_ave is greater than the specified threshold 3, and the number of previous continuous speech frames is greater than the specified threshold 4, then the value of the number of active speech hangover frames is set according to the magnitude of the long-time signal to noise ratio, otherwise, the value of the number of currently active speech hangover frames num_speech_hangover is not updated.

Figure 14:
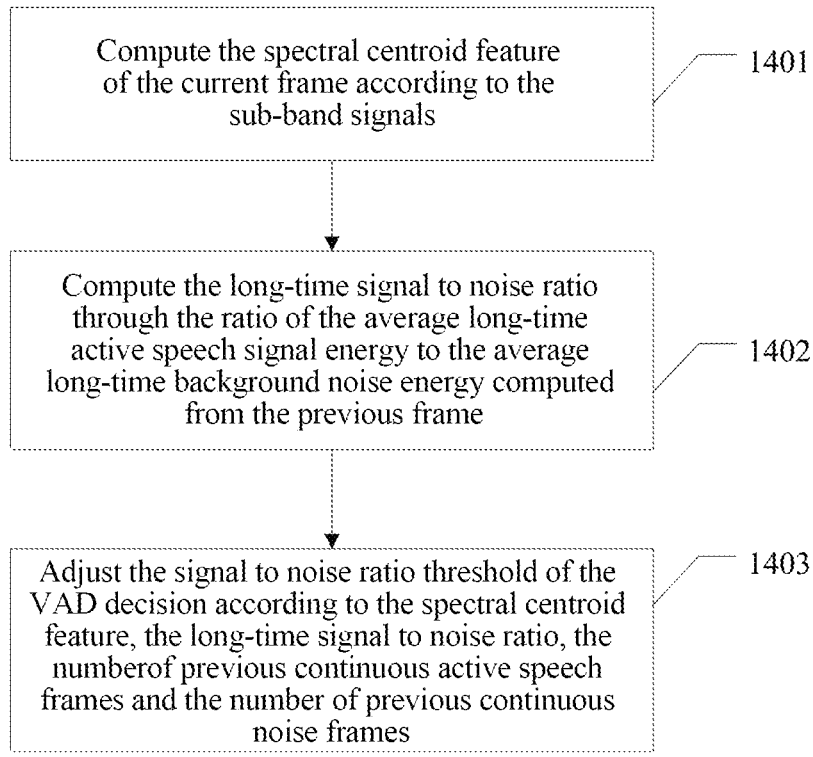
FIG. 14 is a schematic diagram of an embodiment of a method for adjusting a signal to noise ratio threshold in a VAD decision in accordance with the present document.

The present document further provides a method for adjusting a signal to noise ratio threshold in a VAD decision, as shown in FIG. 14, the method for adjusting comprises:

In step 1401, it is to compute a spectral centroid feature of a current frame according to sub-band signals;

in particular, the spectral centroid feature is a ratio of a weighted accumulated value to an un-weighted accumulated value of all or part of the sub-band signal energies, or a value obtained by performing smooth filtering on the ratio.

In Step 1402, it is to compute a long-time signal to noise ratio through a ratio of an average long-time active speech signal energy to an average long-time background noise energy computed from a previous frame;

In step 1403, it is to adjust a signal to noise ratio threshold of the VAD decision according to the spectral centroid feature, the long-time signal to noise ratio, the number of previous continuous active speech frames and the number of previous continuous noise frames continuous_noise_num.

Figure 15:
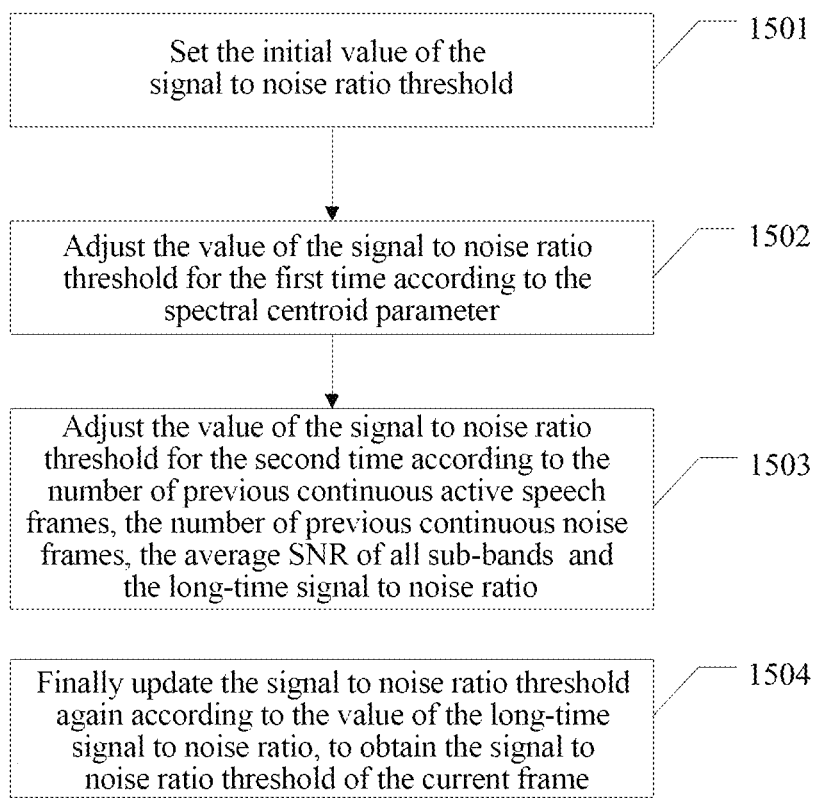
FIG. 15 is a schematic diagram of a specific process of adjusting the signal to noise ratio threshold in accordance with the present document.

Specifically, as shown in FIG. 15, the step of adjusting the signal to noise ratio threshold comprises:

In step 1501, it is to set an initial value of the signal to noise ratio threshold snr_thr;

In step 1502, it is to adjust the value of the signal to noise ratio threshold snr_thr for the first time according to the spectral centroid parameter;

In step 1503, it is to adjust the value of the signal to noise ratio threshold snr_thr for the second time according to the number of previous continuous active speech frames continuous_speech_num, the number of previous continuous noise frames continuous_noise_num, the average SNR of all sub-bands SNR2_lt_ave and the long-time signal to noise ratio lt_snr;

In step 1504, finally it is to update the signal to noise ratio threshold snr_thr again according to the value of the long-time signal to noise ratio lt_snr, to obtain the signal to noise ratio threshold snr_thr of the current frame.

Figure 16:
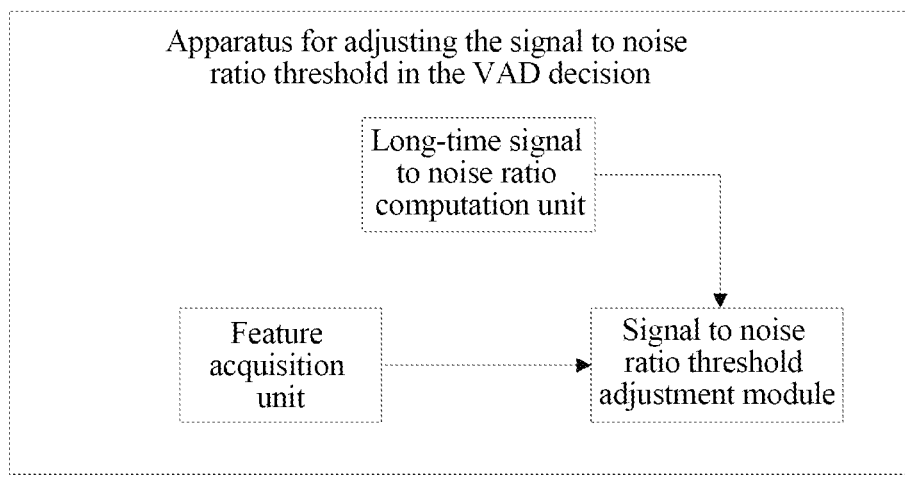
FIG. 16 is a schematic diagram of a module structure of an apparatus for adjusting the signal to noise ratio threshold in a VAD decision in accordance with the present document.

Corresponding to the aforementioned method for adjusting a signal to noise ratio threshold, the present document further provides an apparatus for adjusting a signal to noise ratio threshold in a VAD decision, and as shown in FIG. 16, the apparatus for adjusting comprises:

a feature acquisition unit, used to compute the spectral centroid feature of the current frame according to the sub-band signals;

preferably, the spectral centroid feature is the ratio of the weighted accumulated value to the un-weighted accumulated value of all or part of the sub-band signal energies, or a value obtained by performing smooth filtering on the ratio;

a long-time signal to noise ratio computation unit, used to compute the long-time signal to noise ratio through the ratio of the average long-time active speech signal energy to the average long-time background noise energy computed from the previous frame;

a signal to noise ratio threshold adjustment unit, used to adjust the signal to noise ratio threshold in the VAD decision according to the spectral centroid feature, the long-time signal to noise ratio, the number of previous continuous active speech frames, and the number of previous continuous noise frames continuous_noise_num.

In particular, when the signal to noise ratio threshold adjustment unit adjusts the signal to noise ratio threshold, it sets the initial value of the signal to noise ratio threshold snr_thr; adjusts the value of the signal to noise ratio threshold snr_thr for the first time according to the spectral centroid parameter; adjusts the value of the snr_thr for the second time according to the number of previous continuous active speech frames continuous_speech_num, the number of previous continuous noise frames continuous_noise_num, the average SNR of all sub-bands SNR2_lt_ave and the long-time signal to noise ratio lt_snr; and finally, adjusts the signal to noise ratio threshold snr_thr finally according to the value of the long-time signal to noise ratio lt_snr to obtain the signal to noise ratio threshold snr_thr of the current frame.

Many modern speech-coding standards such as AMR and AMR-WB support the VAD functions. In terms of efficiency, the VAD of these encoders cannot achieve good performance in all of the typical background noises. Especially in the non-stationary noises such as the office noise, the VAD efficiency of these encoders is relatively low. As for music signals, these VADs sometimes have wrong detections, resulting in a noticeable decline in the quality of the corresponding processing algorithms.

The method of the present document overcomes the disadvantages of the existing VAD algorithms, and improves the efficiency of the VAD in detecting the non-stationary noises while improving the accuracy of music detection, enabling an audio signal processing algorithm using the present VAD method to obtain better performance.

The background noise detection method provided in the present document makes the background noise estimation more accurate and stable, which helps to improve the accuracy of the VAD. The tonality signal detection method also provided in the present document improves the accuracy of tonality music detection. The method for updating the number of active speech hangover frames provided in the present document can make the VAD algorithm get a better balance between performance and efficiency under different noises and signal to noise ratios. The method for judging the signal to noise ratio threshold in the VAD decision provided in the present document makes the VAD decision algorithm achieve a better accuracy under different signal to noise ratios, so as to further enhance the efficiency in the condition that the quality is guaranteed.

Those ordinarily skilled in the art can understand that all or some of steps of the abovementioned method may be achieved by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

What is claimed is:

1. A voice activity detection (VAD) method applied in speech coding, wherein, the method comprises:
    obtaining sub-band signals and spectrum amplitudes of a current frame;
    computing values of a energy feature, a spectral centroid feature and a time-domain stability feature of the current frame by using the sub-band signals; computing values of a spectral flatness feature and a tonality feature according to the spectrum amplitudes;
    computing a signal to noise ratio (SNR) parameter of the current frame with a background energy estimated from a previous frame, the energy feature and an energy of SNR sub-bands of the current frame;
    computing a tonality signal flag of the current frame with the energy feature, the spectral centroid feature, the time-domain stability feature, the spectral flatness feature and the tonality feature of the current frame;
    computing a VAD decision result with the tonality signal flag, the signal to noise ratio parameter, the spectral centroid feature, and the energy feature.

2. The method of claim 1, wherein, before or after obtaining a VAD decision result, the method further comprises:
    computing an initial background update flag of the current frame by using the energy feature, the spectral centroid feature, the time-domain stability feature, the spectral flatness feature, and the tonality feature of the current frame;
    after obtaining the VAD decision result, the method further comprises: updating the initial background update flag with the VAD decision, the tonality feature, the SNR parameter, the tonality signal flag, and the time-domain stability feature of the current frame;
    obtaining the energy of background noise over individual sub-band and the energy of background noise over all sub-bands of the current frame with the updated flag of background noise, the energy feature of the current frame, and the energy of background noise over all sub-bands of the previous frame;

wherein, the energy of background noise of the current frame will be used to compute the SNR parameter of a next frame.

3. The method of claim 1, wherein:

the energy feature of the frame is a weighted or non-weighted sum of energies of all sub-bands;

the spectral centroid feature is a ratio of a weighted sum to a non-weighted sum of energies of all sub-bands or partial sub-bands, or a value obtained by applying a smooth filter to that ratio;

the time-domain stability feature is a ratio of a variance of a sum of amplitudes to an expectation of a square of amplitudes, or that ratio multiplied by a factor;

the spectral Flatness Feature is a ratio of a geometric mean to an arithmetic mean of certain spectrum amplitudes, or that ratio multiplied by a factor;

the tonality feature is obtained by computing a correlation coefficient of a spectrum amplitude difference of two adjacent frames, or by further smoothing that correlation coefficient.

4. The method of claim 1, wherein, a step of computing a VAD decision result with the tonality signal flag, the signal to noise ratio parameter, the spectral centroid feature, and the energy feature, is as follows:

a. Obtaining a long-time SNR by computing a ratio of an average energy of long-time active frames to an average energy of long-time background noise for a previous frame;

b. Computing an average SNR of all sub-bands SNR2s for a plurality of recent frames to obtain an average SNR of all sub-bands SNR2_lt_ave;

c. Computing an SNR threshold snr_thr for making the VAD decision with the spectral centroid feature, the long-time SNR lt_snr, a number of previous continuous active frames continuous_speech_num, and a number of previous continuous noise frames continuous_noise_num;

d. Making an initial VAD decision with a VAD decision threshold and the SNR parameters SNR1 and SNR2 of the current frame;

e. Updating the initial VAD decision according to the tonality signal flag, the average SNR of all sub-bands SNR2_lt_ave, the spectral centroid, and the long-time SNR lt_snr;

f. Updating a number of hangover frames for active sound according to the decision result, the long-time SNR lt_snr, and the average SNR of all sub-bands SNR2_lt_ave for a plurality of previous frames, and the SNR parameter and the VAD decision for the current frame;

g. Adding an active-sound hangover according to the decision result and the number of hangover frames for active sound num_speech_hangover of the current frame to make the VAD decision.

5. The method of claim 4, wherein: after the step d, the method further comprises computing the average energy of long-time active frames $E_{fg}$ according to the initial VAD decision result; after the step g, the method further comprises computing the average energy of long-time background noise $E_{bg}$ with the VAD decision, and the computed value is used for making the VAD decision for the next frame.

6. A voice activity detection (VAD) apparatus applied in speech coding, wherein, the apparatus comprises hardware performing instructions stored in a non-transitory computer readable medium which executes steps in following units:

a filter bank, used to obtain sub-band signals of a current frame;

a spectrum amplitude computation unit, used to obtain spectrum amplitudes of the current frame;

a feature acquisition unit, used to compute values of a energy feature, a spectral centroid feature and a time-domain stability feature of the current frame according to the sub-band signals; compute values of a spectral flatness feature and a tonality feature according to the spectrum amplitudes;

a flag computation unit, used to compute a tonality signal flag of the current frame according to the energy feature, the spectral centroid feature, the time-domain stability feature, the spectral flatness feature and the tonality feature of the current frame;

a signal to noise ratio computation unit, used to compute a signal to noise ratio parameter of the current frame according to a background noise energy estimated from a previous frame, a energy of SNR sub-bands and the energy feature of the current frame;

a VAD decision unit, used to compute a VAD decision result according to the tonality signal flag, the signal to noise ratio parameter, the spectral centroid feature and the energy feature.

7. A background noise detection method applied in speech coding, wherein, the method comprises:

obtaining sub-band signals and spectrum amplitudes of a current frame;

computing values of a energy feature, a spectral centroid feature and a time-domain stability feature of the current frame by using the sub-band signals; computing values of a spectral flatness feature and a tonality feature according to the spectrum amplitudes;

detecting background noise by using the energy feature, the spectral centroid feature, the time-domain stability feature, the spectral flatness feature, and the tonality feature of the current frame, and judging whether the current frame is background noise or not.

8. The method of claim 7, wherein:

the energy feature of the current frame is a weighted or non-weighted sum of energies of all sub-bands;

the spectral centroid feature is a ratio of a weighted sum to a non-weighted sum of energies of all sub-bands or partial sub-bands, or a value obtained by applying a smooth filter to that ratio;

the time-domain stability feature is a ratio of a variance of a sum of amplitudes to an expectation of a square of amplitudes, or that ratio multiplied by a factor;

the spectral Flatness Feature is a ratio of a geometric mean to an arithmetic mean of certain spectrum amplitudes, or that ratio multiplied by a factor.

9. The method of claim 7, wherein, if any one of the following conditions is met, the current frame is not noise signal:

the time-domain stability feature lt_stable_rate0 is greater than a specified threshold a smoothly-filtered value of the spectral centroid of a first section is greater than a specified threshold value, and the time-domain stability feature is also greater than a specified threshold value;

a value of the tonality feature or the smoothly-filtered tonality feature is greater than a specified threshold value, and the time-domain stability feature lt_stable_rate0 is also greater than a specified threshold value;

the spectral flatness of each sub-band or an average obtained by smoothing the spectral flatness is smaller than its specified threshold;
or, it is determined that the energy of the current frame $E_{t1}$ is greater than a specified threshold value E_thr1.

10. A tonality signal detection method applied in the field of speech coding, wherein, the method comprises:
obtaining sub-band signals and spectrum amplitudes of a current frame;
computing values of a energy feature, a spectral centroid feature and a time-domain stability feature of the current frame by using the sub-band signals; computing values of a spectral flatness feature and a tonality feature according to the spectrum amplitudes;
with the tonality feature, the time-domain stability feature, the spectral flatness feature, and the spectral centroid feature of the current frame, determining whether the current frame is tonal signal.

11. The method of claim 10, wherein:
the spectral centroid feature is a ratio of a weighted sum to a non-weighted sum of energies of all sub-bands or partial sub-bands, or a value obtained by applying a smooth filter to that ratio;
the time-domain stability feature is a ratio of a variance of a sum of amplitudes to an expectation of a square of amplitudes, or that ratio multiplied by a factor;
the spectral Flatness Feature is a ratio of a geometric mean to an arithmetic mean of certain spectrum amplitudes, or that ratio multiplied by a factor;
the tonality feature is obtained by computing a correlation coefficient of a spectrum amplitude difference of two adjacent frames, or by further smoothing that correlation coefficient.

12. The method of claim 10, wherein: when judging whether the current frame is a tonality signal or not, the following operations are performed:
A) Supposing the current frame is non-tonal signal and using a tonality frame flag tonality_frame to indicate whether the current frame is tonal;
B) If the tonality feature tonality_rate1 or its smoothed value tonality_rate2 is greater than a specified threshold, going to Step C), otherwise, going to Step D);
C) If the time-domain stability feature is smaller than a specified threshold, the spectral centroid feature is greater than a specified threshold, and the spectral flatness feature of each sub-band is smaller than its specified threshold thereof, then considering the current frame as a tonal frame, and setting the tonality frame flag, otherwise considering the current frame as a non-tonal frame, and setting the tonality frame flag, and going to step D);
D) Updating a tonal level feature tonality_degree according to the tonality frame flag, wherein an initial value of the tonal level feature tonality_degree is set when an active-sound detector begins to work;
E) Determining whether the current frame is tonal according to the updated tonal level feature tonality_degree and setting the tonality signal flag tonality_flag.

13. The method of claim 10, wherein: if the current tonality frame flag indicates that the current frame is tonal, the following equation is used to update the tonal level feature tonality_degree:

$$\text{tonality\_degree} = \text{tonality\_degree}_{-1} \cdot td\_scale\_A + td\_scale\_B;$$

wherein, tonality_degree$_{-1}$ is the tonal level feature of a previous frame whose initial value is set in a region of [0,1], td_scale_A is an attenuation coefficient, and td_scale_B is an accumulation coefficient.

14. The method of claim 10, wherein:
If the tonal level feature tonality_degree is greater than a specified threshold, the current frame is determined as tonal signal, otherwise, the current frame is determined as non-tonal signal.

15. A method applied in speech coding for updating a number of current active speech hangover frames in a VAD decision, wherein, the method comprises:
obtaining sub-band signals and spectrum amplitudes of a current frame;
Obtaining a long-time SNR lt_snr and an average SNR of all sub-bands SNR2_lt_ave by using the sub-band signals, updating a number of hangover frames for active sound according to a decision result, the long-time SNR lt_snr, and the average SNR of all sub-bands SNR2_lt_ave for several previous frames, and the VAD decision for the current frame.

16. The method of claim 15, wherein, the long-time SNR lt_snr is computed through a ratio of an average energy of long-time active frames to an average energy of long-time background noise for a previous frame; the average SNR of all sub-bands SNR2s for a plurality of recent frames is computed to obtain the average SNR of all sub-bands SNR2_lt_ave.

17. The method of claim 15, wherein a precondition for updating the current number of hangover frames for active sound is that a flag of active sound indicates that the current frame is active sound.

18. The method of claim 15, wherein, when updating the number of current active speech hangover frames, if a number of previous continuous active frames is less than a specified threshold 1, and the long-time SNR lt_snr is less than a specified threshold 2, then the current number of hangover frames for active sound is updated by subtracting the number of previous continuous active frames from a minimum number of continuous active frames; otherwise, if the average SNR of all sub-bands SNR2_lt_ave is greater than a specified threshold 3, and the number of previous continuous active frames is greater than a specified threshold 4, then the number of hangover frames for active sound is set according to a value of the long-time SNR, otherwise, that number of hangover frames is not updated.

19. A method applied in speech coding for adjusting a signal to noise ratio threshold in a VAD decision, wherein, the method for adjusting comprises:
obtaining sub-band signals and spectrum amplitudes of a current frame;
computing a spectral centroid feature of the current frame with the sub-band signals;
computing a long-time SNR through a ratio of an average energy of long-time active frames to an average energy of long-time background noise for a previous frame;
adjusting an SNR threshold for making the VAD decision with the spectral centroid feature, the long-time SNR, a number of previous continuous active frames continuous_speech_num, and a number of previous continuous noise frames continuous_noise_num.

20. The method of claim 19, wherein:
the spectral centroid feature is a ratio of a weighted sum to a non-weighted sum of energies of all sub-bands or partial sub-bands, or a value obtained by applying a smooth filter to that ratio.

21. The method of claim 19, wherein, the step of adjusting a signal to noise ratio threshold comprises:

setting an initial value of the SNR threshold snr_thr;

first adjusting the SNR threshold snr_thr with the spectral centroid feature;

further adjusting the snr_thr according to the number of previous continuous active frames continuous_speech_num, and the number of previous continuous noise frames continuous_noise_num, an average SNR of all sub-bands SNR2_lt_ave, and the long-time SNR lt_snr;

finally updating the SNR threshold snr_thr again according to the long-time SNR lt_snr to obtain the SNR threshold snr_thr of the current frame.

22. The method of claim 19, wherein, an average SNR of all sub-bands SNR2s for a plurality of recent frames is computed to obtain the average SNR of all sub-bands SNR2_lt_ave.

\* \* \* \* \*